(12) United States Patent
Bae et al.

(10) Patent No.: US 11,528,493 B2
(45) Date of Patent: Dec. 13, 2022

(54) METHOD AND SYSTEM FOR VIDEO TRANSCODING BASED ON SPATIAL OR TEMPORAL IMPORTANCE

(71) Applicant: ALIBABA GROUP HOLDING LIMITED, Grand Cayman (KY)

(72) Inventors: Tae Meon Bae, San Mateo, CA (US); Shaolin Xie, San Mateo, CA (US); Minghai Qin, San Mateo, CA (US); Yen-kuang Chen, San Mateo, CA (US); Guanlin Wu, San Mateo, CA (US); Qinggang Zhou, San Mateo, CA (US)

(73) Assignee: Alibaba Group Holding Limited, Grand Cayman (KY)

( * ) Notice: Subject to any disclaimer, the term of this patent is extended or adjusted under 35 U.S.C. 154(b) by 61 days.

(21) Appl. No.: 16/868,014

(22) Filed: May 6, 2020

(65) Prior Publication Data
US 2021/0352307 A1 Nov. 11, 2021

(51) Int. Cl.
| | |
|---|---|
| H04N 19/40 | (2014.01) |
| H04N 19/159 | (2014.01) |
| H04N 19/176 | (2014.01) |
| G06T 9/00 | (2006.01) |
| G06T 5/00 | (2006.01) |
| G06T 7/11 | (2017.01) |
| G06N 20/00 | (2019.01) |
| G06T 3/40 | (2006.01) |

(52) U.S. Cl.
CPC ............ *H04N 19/40* (2014.11); *G06N 20/00* (2019.01); *G06T 3/4007* (2013.01); *G06T 5/001* (2013.01); *G06T 7/11* (2017.01); *G06T 9/00* (2013.01); *H04N 19/159* (2014.11); *H04N 19/176* (2014.11); *G06T 2207/20081* (2013.01)

(58) Field of Classification Search
CPC ............................. H04N 19/40; G06N 20/00
See application file for complete search history.

(56) References Cited

U.S. PATENT DOCUMENTS

| | | | |
|---|---|---|---|
| 2019/0132597 A1* | 5/2019 | Yamada | H04N 19/176 |
| 2020/0090322 A1* | 3/2020 | Seo | G06N 3/084 |
| 2021/0018938 A1* | 1/2021 | Qian | G08G 5/0052 |
| 2021/0118112 A1* | 4/2021 | Huang | G06N 3/0472 |

* cited by examiner

*Primary Examiner* — Jerry T Jean Baptiste
(74) *Attorney, Agent, or Firm* — Finnegan, Henderson, Farabow, Garrett & Dunner, LLP

(57) ABSTRACT

Methods and apparatuses for video transcoding based on spatial or temporal importance include: in response to receiving an encoded video bitstream, decoding a picture from the encoded video bitstream; determining a first level of spatial importance for a first region of a background of the picture based on an image segmentation technique; applying to the first region a first resolution-enhancement technique associated with the first level of spatial importance for increasing resolution of the first region by a scaling factor, wherein the first resolution-enhancement technique is selected from a set of resolution-enhancement techniques having different computational complexity levels; and encoding the first region using a video coding standard.

30 Claims, 16 Drawing Sheets

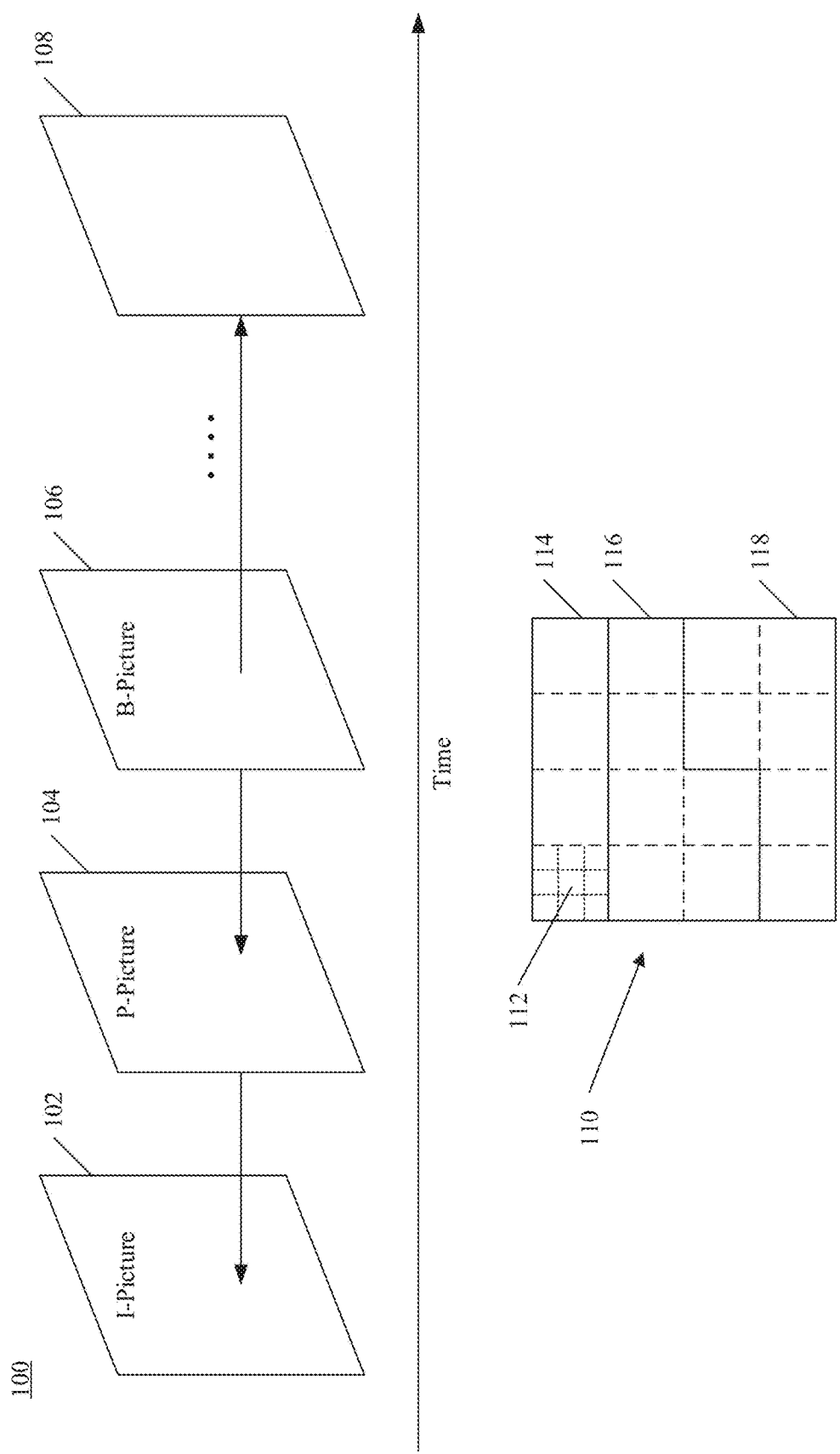

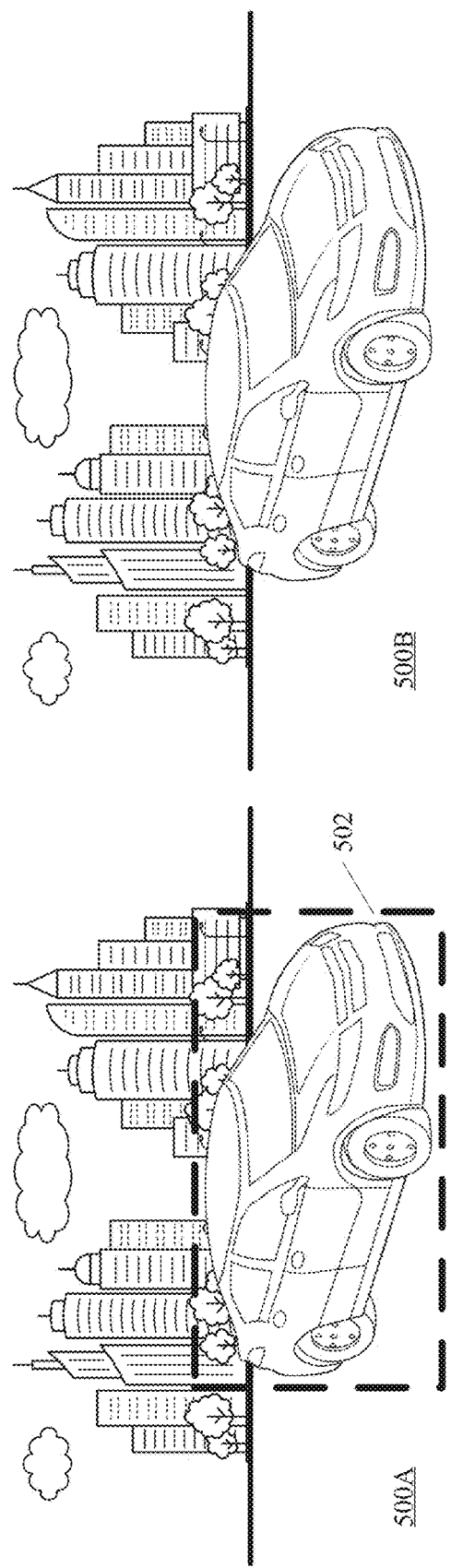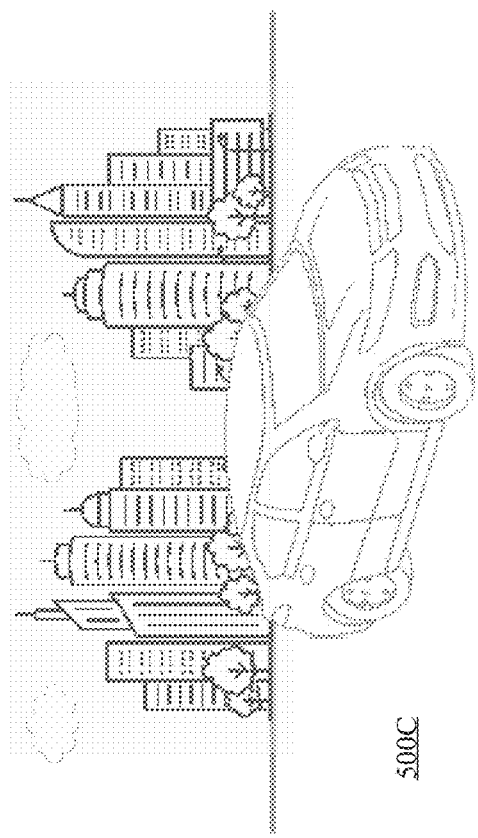
FIG. 5A
FIG. 5B
FIG. 5C

METHOD AND SYSTEM FOR VIDEO TRANSCODING BASED ON SPATIAL OR TEMPORAL IMPORTANCE

TECHNICAL FIELD

The present disclosure generally relates to video data transcoding, and more particularly, to methods, apparatuses, and systems for video transcoding based on spatial or temporal importance.

BACKGROUND

Image resolution enhancement (also referred to as "image super resolution" or "upscaling") is a process of increasing resolution of an image. For a video, if one or more of its images are resolution-enhanced, the resolution of the video can also be increased. Image resolution enhancement is used in many application scenarios, such as video streaming, high-definition video displays, or postproduction in filmmaking. For example, in video streaming, a video sender (e.g., a website) can store low-resolution video in a storage device for reducing needed storage space and transmission bandwidth, and transmit the low-resolution video to a video receiver (e.g., a cellphone) where the low-resolution video can be resolution-enhanced for improving user experience.

SUMMARY

Embodiments of this disclosure provide methods, apparatus, and apparatus for characteristic-based video processing.

In an aspect, a non-transitory computer-readable storage medium is provided. The non-transitory computer-readable storage medium stores a set of instructions that are executable by one or more processors of a device to cause the device to perform a method of: in response to receiving an encoded video bitstream, decoding a picture from the encoded video bitstream; determining a first level of spatial importance for a first region of a background of the picture based on an image segmentation technique; applying to the first region a first resolution-enhancement technique associated with the first level of spatial importance for increasing resolution of the first region by a scaling factor, wherein the first resolution-enhancement technique is selected from a set of resolution-enhancement techniques having different computational complexity levels; and encoding the first region using a video coding standard.

In another aspect, an apparatus is provided. The apparatus includes a memory configured to store a set of instructions and one or more processors coupled to the memory and configured to execute the set of instructions to cause the apparatus to: in response to receiving an encoded video bitstream, decode a picture from the encoded video bitstream; determine a first level of spatial importance for a first region of a background of the picture based on an image segmentation technique; apply to the first region a first resolution-enhancement technique associated with the first level of spatial importance for increasing resolution of the first region by a scaling factor, wherein the first resolution-enhancement technique is selected from a set of resolution-enhancement techniques having different computational complexity levels; and encode the first region using a video coding standard.

In another aspect, a computer-implemented method is provided. The method includes: in response to receiving an encoded video bitstream, decoding a picture from the encoded video bitstream; determining a first level of spatial importance for a first region of a background of the picture based on an image segmentation technique; applying to the first region a first resolution-enhancement technique associated with the first level of spatial importance for increasing resolution of the first region by a scaling factor, wherein the first resolution-enhancement technique is selected from a set of resolution-enhancement techniques having different computational complexity levels; and encoding the first region using a video coding standard.

BRIEF DESCRIPTION OF THE DRAWINGS

Embodiments and various aspects of this disclosure are illustrated in the following detailed description and the accompanying figures. Various features shown in the figures are not drawn to scale.

FIG. 1 illustrates structures of an example video sequence, according to some embodiments of this disclosure.

FIG. 5A is a schematic diagram illustrating an example picture of a video, according to some embodiments of this disclosure.

FIG. 5B is a schematic diagram illustrating an example picture enhanced from the picture of FIG. 5A using a first resolution-enhancement technique, according to some embodiments of this disclosure.

FIG. 5C is a schematic diagram illustrating an example picture enhanced from the picture of FIG. 5A using a second resolution-enhancement technique, according to some embodiments of this disclosure.

DETAILED DESCRIPTION

Figure 2A:
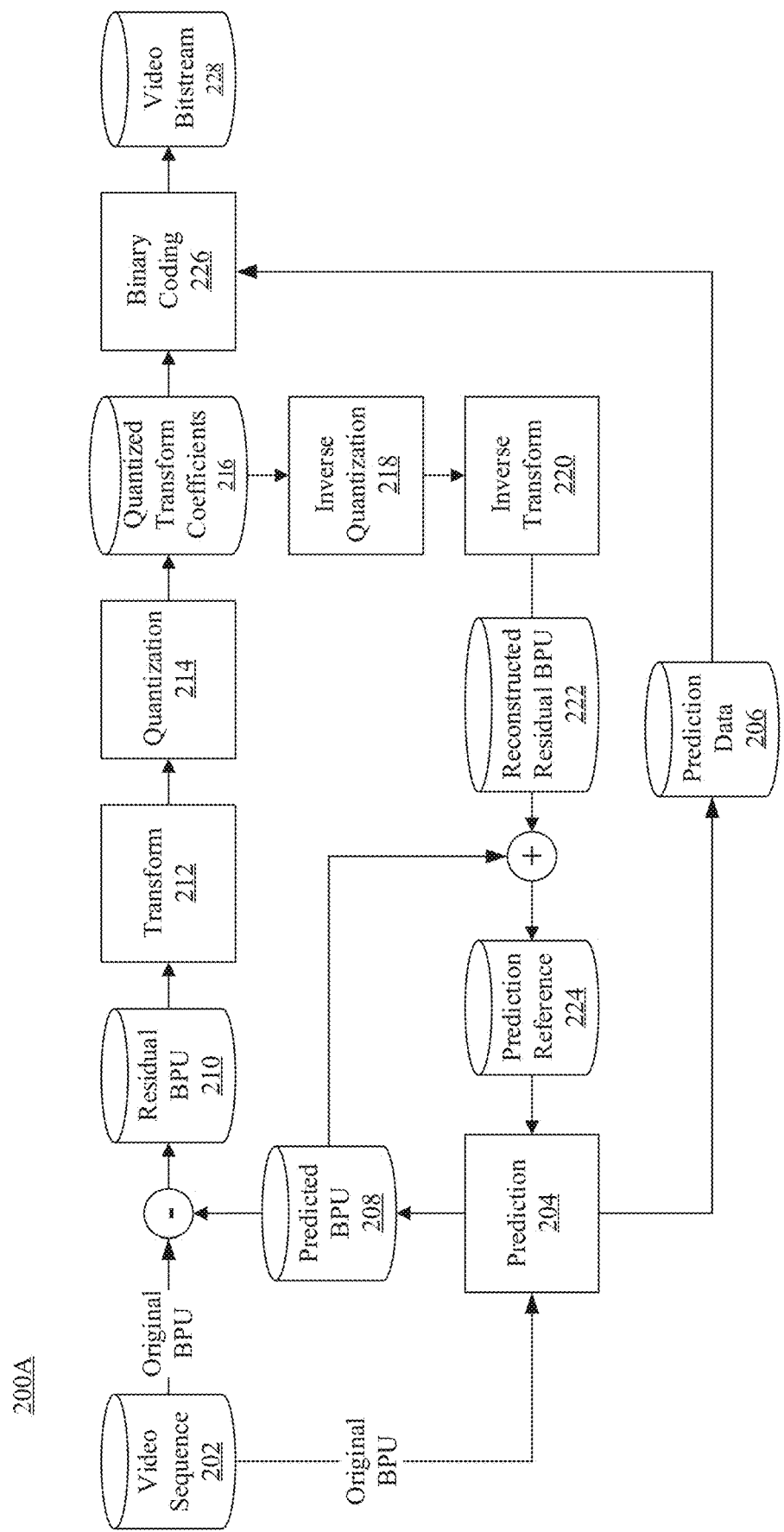
FIG. 2A illustrates a schematic diagram of an example encoding process for video processing based on spatial or temporal importance, according to some embodiments of this disclosure.

Reference will now be made in detail to example embodiments, examples of which are illustrated in the accompanying drawings. The following description refers to the accompanying drawings in which the same numbers in different drawings represent the same or similar elements unless otherwise represented. The implementations set forth in the following description of example embodiments do not represent all implementations consistent with the invention. Instead, they are merely examples of apparatuses and methods consistent with aspects related to the invention as recited in the appended claims. Unless specifically stated otherwise, the term "or" encompasses all possible combinations, except where infeasible. For example, if it is stated that a component can include A or B, then, unless specifically stated otherwise or infeasible, the component can include A, or B, or A and B. As a second example, if it is stated that a component can include A, B, or C, then, unless specifically stated otherwise or infeasible, the component can include A, or B, or C, or A and B, or A and C, or B and C, or A and B and C.

A video is a set of static pictures (or "frames") arranged in a temporal sequence to store visual information. A video capture device (e.g., a camera) can be used to capture and store those pictures in a temporal sequence, and a video playback device (e.g., a television, a computer, a smartphone, a tablet computer, a video player, or any end-user terminal with a function of display) can be used to display such pictures in the temporal sequence. Also, in some applications, a video capturing device can transmit the captured video to the video playback device (e.g., a computer with a monitor) in real-time, such as for surveillance, conferencing, or live broadcasting.

For reducing the storage space and the transmission bandwidth needed by such applications, the video can be compressed before storage and transmission and decompressed before the display. The compression and decompression can be implemented by software executed by a processor (e.g., a processor of a generic computer) or specialized hardware. The module for compression is generally referred to as an "encoder," and the module for decompression is generally referred to as a "decoder." The encoder and decoder can be collectively referred to as a "codec." The encoder and decoder can be implemented as any of a variety of suitable hardware, software, or a combination thereof. For example, the hardware implementation of the encoder and decoder can include circuitry, such as one or more microprocessors, digital signal processors (DSPs), application-specific integrated circuits (ASICs), field-programmable gate arrays (FPGAs), discrete logic, or any combinations thereof. The software implementation of the encoder and decoder can include program codes, computer-executable instructions, firmware, or any suitable computer-implemented algorithm or process fixed in a computer-readable medium. Video compression and decompression can be implemented by various algorithms or standards, such as MPEG-1, MPEG-2, MPEG-4, H.26x series, or the like. In some applications, the codec can decompress the video from a first coding standard and re-compress the decompressed video using a second coding standard, in which case the codec can be referred to as a "transcoder."

The video encoding process can identify and keep useful information that can be used to reconstruct a picture and disregard less important information for the reconstruction. If the disregarded, less important information cannot be fully reconstructed, such an encoding process can be referred to as "lossy." Otherwise, it can be referred to as "lossless." Most encoding processes are lossy, which is a tradeoff to reduce the needed storage space and the transmission bandwidth.

The useful information of a picture being encoded (referred to as a "current picture") include changes with respect to a reference picture (e.g., a picture previously encoded and reconstructed). Such changes can include position changes, luminosity changes, or color changes of the pixels, among which the position changes are mostly concerned. Position changes of a group of pixels that represent an object can reflect the motion of the object between the reference picture and the current picture.

A picture coded without referencing another picture (i.e., it is its own reference picture) is referred to as an "I-picture." A picture coded using a previous picture as a reference picture is referred to as a "P-picture." A picture coded using both a previous picture and a future picture as reference pictures (i.e., the reference is "bi-directional") is referred to as a "B-picture."

As previously mentioned, various image resolution-enhancement techniques can be used to enhance the user experience when displaying the decoded video. Typically, resolution-enhancement techniques can be categorized into three types: interpolation-based techniques, reconstruction-based techniques, and learning-based techniques. Generally, the interpolation-based techniques have low computational complexity, the reconstruction-based techniques have low to intermediate computational complexity, and the learning-based techniques have intermediate to high computational complexity.

The interpolation-based techniques (e.g., a bilinear interpolation technique, a bicubic interpolation technique, a Lanczos resampling technique, or the like) can apply interpolations to pixel values of a low-resolution image for upsampling such pixel values to generate a high-resolution version of the image. The interpolation-based techniques can be performed at rapid speed with good quality in homogeneous image regions. However, for an image region that has drastic pixel value changes (e.g., edges of a bright object in a dark background), the interpolation-based techniques can produce various defects, such as aliasing, blurring, zigzagging edges, or other regularity ("smoothness") issues.

The reconstruction-based techniques can simulate an image formation process (e.g., a linear mapping process for simulating blurring and noises) of a low-resolution image from a high-resolution image and solve an inversion of the image formation process to generate a high-resolution version of the image. For example, the reconstruction-based techniques can include a maximum a posteriori (MAP) technique, a regularized maximum likelihood technique, a projection onto convex sets (POCS) technique, an iterative back-projection technique, or the like. In some embodiments, such simulation can rely on prior knowledge to restrict a resolution space for the resolution enhancement, in which the generated high-resolution image can have high quality. However, as the scale factor (i.e., a ratio of the resolution of the high-resolution image over the resolution of the low-resolution image) increases, the performance of the reconstructed-based techniques can degrade rapidly.

The learning-based techniques (also referred to as "example-based techniques") can predict details of a low-resolution image based on knowledge obtained by training based on a set of examples (referred to as a "training set"). The learning-based techniques can analyze statistical relationships between example low-resolution images and corresponding example high-resolution images to obtain such knowledge. For example, the learning-based techniques can include a Markov random field (MRF) technique, a neighbor embedding technique, a sparse coding technique, a random forest technique, a machine learning technique (e.g., a deep learning technique), or the like.

For example, a deep learning technique can use an artificial neural network (ANN) for taking input data and outputting informative hierarchical representations of the input data. The structure of the ANN can include an input layer, an output layer, and multiple hidden layers between the input and output layers. Each of the hidden layers can include multiple nodes ("neurons") that are implemented based on perceptron algorithms. The ANN can be trained with a training set (e.g., labeled data or unlabeled data) using, for example, a backpropagation algorithm. When the hidden layers are more than one, the ANN can be referred to as a deep neural network (DNN). For example, the DNN can be a convolutional neural network (CNN), a recurrent neural network (RNN), or the like. The DNN can be trained by supervised learning algorithms or unsupervised learning algorithms. For example, a DNN trained by unsupervised learning algorithm can include a deep Boltzmann machine (DBM), a variational autoencoder (VAE), a generative adversarial net (GAN), or the like.

Among the above-described resolution-enhancement techniques, DNN-based techniques can generally provide very high-quality results, which can make it attractive for commercial application scenarios. However, DNN-based techniques can be very computation-intensive. For example, for upscaling an image region of 3×3 pixels using a bilinear interpolation technique, the computational costs can be 9 operations (e.g., interpolations) per pixel. In contrast, for upscaling the same image region using a CNN model having 4 layers and 64 kernels, the computational costs can be 45,648 operations (e.g., image convolutions) per pixel. Such high computational complexity is a great challenge for applying DNN-based resolution-enhancement techniques in various application scenarios, such as video transcoding, live video streaming, large-scale video storing, or the like.

For example, in a video streaming application scenario, a master video (e.g., uploaded by a user or acquired from a content provider) can have an original resolution and can be stored in a server (e.g., a server computer or a database computer) of a service provider (e.g., a streaming service provider). When different user devices (e.g., a smartphone, a tablet computer, a desktop computer, or the like) connect to the server for viewing the master video, the service provider can transcode the master video into different resolutions to adapt to the different transmission bandwidths of the user devices or different quality demands of users. For example, a user device can be a smartphone having low transmission bandwidth, and the service provider can lower the resolution of the master video (e.g., by transcoding it into a lower-resolution version) before network transmission. For another example, the user device can be a smart television having a high bandwidth for network transmission, and if the user demands a 4K resolution for displaying the master video, the service provider can enhance the resolution of the master video (e.g., by transcoding it into a higher-resolution version) before network transmission. Because of the great computational complexity of the DNN-based resolution-enhancement techniques, it can be a great challenge to apply the DNN-based resolution-enhancement techniques with short time and low cost in the above application scenario.

This disclosure provides methods, apparatuses, and systems for video transcoding based on spatial or temporal importance. A "spatial importance" herein refers to a level of importance or a level of interest associated with visual contents in a picture (e.g., a region of interest in the picture). A "temporal importance" herein refers to a level of importance or a level of interest associated with a picture (e.g., I-, P-, or B-picture) among a set of consecutive pictures. Each of the spatial importance and temporal importance can include one or more levels, each of which can represent different attractiveness or amount of information for a viewer of the video. Typically, in video streaming, the viewer focuses on regions of interest (ROIs) of pictures of the video and tend to ignore backgrounds in the pictures. The ROIs can include, for example, a face of an individual, foreground characters or objects, regions with fine details, or the like. That is, viewers are more attentive to ROIs or regions that include more information than the background.

In this disclosure, a codec can decode an encoded video bitstream to a video sequence, processing the decoded video sequence for resolution enhancement, then re-encode the processed video sequence. When processing the decoded video sequence for resolution enhancement, the codec can detect portions of the video for their levels of spatial importance. A portion having a higher spatial importance (referred to as a "more important portion") can be upscaled using a complex resolution-enhancement technique (e.g., a DNN-based technique). For example, the more important portions can include portions having high spatial importance (e.g., ROIs) or portions having high temporal importance (e.g., I-pictures), or a combination thereof. A portion having lower spatial importance (referred to as a "less important portion") can be upscaled using a less complex resolution-enhancement technique (e.g., an interpolation-based technique). For example, the less important portions can include portions having low spatial importance (e.g., backgrounds), portions having low temporal importance (e.g., P-pictures), or a combination thereof. Via processing and transcoding a video in such a way, the DNN-based technique can greatly improve the image quality for the more important portions after upscaling, while the computational costs of overall resolution enhancement and transcoding would not be greatly increased. Also, when the image quality of the upscaled more important portions is preserved, the suboptimal quality of the less important portions can be subjectively unnoticeable to the viewer. Thereby, the quality of the upscaled, transcoded video can be subjectively accepted by the viewer.

FIG. 1 illustrates structures of an example video sequence 100, according to some embodiments of this disclosure. Video sequence 100 can be a live video or a video having been captured and archived. Video sequence 100 can be a real-life video, a computer-generated video (e.g., computer game video), or a combination thereof (e.g., a real-life video with augmented-reality effects). Video sequence 100 can be inputted from a video capture device (e.g., a camera), a video archive (e.g., a video file stored in a storage device) containing previously captured video, or a video feed interface (e.g., a video broadcast transceiver) to receive video from a video content provider.

As shown in FIG. 1, video sequence 100 can include a series of pictures arranged temporally along a timeline, including pictures 102, 104, 106, and 108. Pictures 102-106 are continuous, and there are more pictures between pictures 106 and 108. In FIG. 1, picture 102 is an I-picture, the reference picture of which is picture 102 itself. Picture 104 is a P-picture, the reference picture of which is picture 102, as indicated by the arrow. Picture 106 is a B-picture, the reference pictures of which are pictures 104 and 108, as indicated by the arrows. In some embodiments, the reference picture of a picture (e.g., picture 104) can be not immediately preceding or following the picture. For example, the reference picture of picture 104 can be a picture preceding picture 102. It should be noted that the reference pictures of pictures 102-106 are only examples, and this disclosure does not limit embodiments of the reference pictures as the examples shown in FIG. 1.

Typically, video codecs do not encode or decode an entire picture at one time due to the computing complexity of such tasks. Rather, they can split the picture into basic segments, and encode or decode the picture segment by segment. Such basic segments are referred to as basic processing units ("BPUs") in this disclosure. For example, structure 110 in FIG. 1 shows an example structure of a picture of video sequence 100 (e.g., any of pictures 102-108). In structure 110, a picture is divided into 4×4 basic processing units, the boundaries of which are shown as dash lines. In some embodiments, the basic processing units can be referred to as "macroblocks" in some video coding standards (e.g., MPEG family, H.261, H.263, or H.264/AVC), or as "coding tree units" ("CTUs") in some other video coding standards (e.g., H.265/HEVC or H.266/VVC). The basic processing units can have variable sizes in a picture, such as 128×128, 64×64, 32×32, 16×16, 4×8, 16×32, or any arbitrary shape and size of pixels. The sizes and shapes of the basic processing units can be selected for a picture based on the balance of coding efficiency and levels of details to be kept in the basic processing unit.

The basic processing units can be logical units, which can include a group of different types of video data stored in a computer memory (e.g., in a video frame buffer). For example, a basic processing unit of a color picture can include a luma component (Y) representing achromatic brightness information, one or more chroma components (e.g., Cb and Cr) representing color information, and associated syntax elements, in which the luma and chroma components can have the same size of the basic processing unit. The luma and chroma components can be referred to as "coding tree blocks" ("CTBs") in some video coding standards (e.g., H.265/HEVC or H.266/VVC). Any operation performed to a basic processing unit can be repeatedly performed to each of its luma and chroma components.

Video coding has multiple stages of operations, examples of which will be detailed in FIGS. 2A-2B and 3A-3B. For each stage, the size of the basic processing units can still be too large for processing, and thus can be further divided into segments referred to as "basic processing sub-units" in this disclosure. In some embodiments, the basic processing sub-units can be referred to as "blocks" in some video coding standards (e.g., MPEG family, H.261, H.263, or H.264/AVC), or as "coding units" ("CUs") in some other video coding standards (e.g., H.265/HEVC or H.266/VVC).

A basic processing sub-unit can have the same or smaller size than the basic processing unit. Similar to the basic processing units, basic processing sub-units are also logical units, which can include a group of different types of video data (e.g., Y, Cb, Cr, and associated syntax elements) stored in a computer memory (e.g., in a video frame buffer). Any operation performed to a basic processing sub-unit can be repeatedly performed to each of its luma and chroma components. It should be noted that such division can be performed to further levels depending on processing needs. It should also be noted that different stages can divide the basic processing units using different schemes.

For example, at a mode decision stage (an example of which will be detailed in FIG. 2B), the encoder can decide what prediction mode (e.g., intra-picture prediction or inter-picture prediction) to use for a basic processing unit, which can be too large to make such a decision. The encoder can split the basic processing unit into multiple basic processing sub-units (e.g., CUs as in H.265/HEVC or H.266/VVC), and decide a prediction type for each individual basic processing sub-unit.

For another example, at a prediction stage (an example of which will be detailed in FIG. 2A), the encoder can perform prediction operation at the level of basic processing sub-units (e.g., CUs). However, in some cases, a basic processing sub-unit can still be too large to process. The encoder can further split the basic processing sub-unit into smaller segments (e.g., referred to as "prediction blocks" or "PBs" in H.265/HEVC or H.266/VVC), at the level of which the prediction operation can be performed.

For another example, at a transform stage (an example of which will be detailed in FIG. 2A), the encoder can perform a transform operation for residual basic processing sub-units (e.g., CUs). However, in some cases, a basic processing sub-unit can still be too large to process. The encoder can further split the basic processing sub-unit into smaller segments (e.g., referred to as "transform blocks" or "TBs" in H.265/HEVC or H.266/VVC), at the level of which the transform operation can be performed. It should be noted that the division schemes of the same basic processing sub-unit can be different at the prediction stage and the transform stage. For example, in H.265/HEVC or H.266/VVC, the prediction blocks and transform blocks of the same CU can have different sizes and numbers.

In structure 110 of FIG. 1, basic processing unit 112 is further divided into 3×3 basic processing sub-units, the boundaries of which are shown as dotted lines. Different basic processing units of the same picture can be divided into basic processing sub-units in different schemes.

In some implementations, to provide the capability of parallel processing and error resilience to video encoding and decoding, a picture can be divided into regions for processing, such that, for a region of the picture, the encoding or decoding process can depend on no information from any other region of the picture. In other words, each region of the picture can be processed independently. By doing so, the codec can process different regions of a picture in parallel, thus increasing the coding efficiency. Also, when data of a region is corrupted in the processing or lost in network transmission, the codec can correctly encode or decode other regions of the same picture without reliance on the corrupted or lost data, thus providing the capability of error resilience. In some video coding standards, a picture can be divided into different types of regions. For example, H.265/HEVC and H.266/VVC provide two types of regions: "slices" and "tiles." It should also be noted that different pictures of video sequence 100 can have different partition schemes for dividing a picture into regions.

For example, in FIG. 1, structure 110 is divided into three regions 114, 116, and 118, the boundaries of which are shown as solid lines inside structure 110. Region 114 includes four basic processing units. Each of regions 116 and 118 includes six basic processing units. It should be noted that the basic processing units, basic processing sub-units, and regions of structure 110 in FIG. 1 are only examples, and this disclosure does not limit embodiments thereof.

FIG. 2A illustrates a schematic diagram of an example encoding process 200A for video processing based on spatial or temporal importance, according to some embodiments of this disclosure. An encoder can encode video sequence 202 into video bitstream 228 according to process 200A. Similar to video sequence 100 in FIG. 1, video sequence 202 can include a set of pictures (referred to as "original pictures") arranged in a temporal order. Similar to structure 110 in FIG. 1, each original picture of video sequence 202 can be divided by the encoder into basic processing units, basic processing sub-units, or regions for processing. In some embodiments, the encoder can perform process 200A at the level of basic processing units for each original picture of video sequence 202. For example, the encoder can perform process 200A in an iterative manner, in which the encoder can encode a basic processing unit in one iteration of process 200A. In some embodiments, the encoder can perform process 200A in parallel for regions (e.g., regions 114-118) of each original picture of video sequence 202.

In FIG. 2A, the encoder can feed a basic processing unit (referred to as an "original BPU") of an original picture of video sequence 202 to prediction stage 204 to generate prediction data 206 and predicted BPU 208. The encoder can subtract predicted BPU 208 from the original BPU to generate residual BPU 210. The encoder can feed residual BPU 210 to transform stage 212 and quantization stage 214 to generate quantized transform coefficients 216. The encoder can feed prediction data 206 and quantized transform coefficients 216 to binary coding stage 226 to generate video bitstream 228. Components 202, 204, 206, 208, 210, 212, 214, 216, 226, and 228 can be referred to as a "forward path." During process 200A, after quantization stage 214, the encoder can feed quantized transform coefficients 216 to inverse quantization stage 218 and inverse transform stage 220 to generate reconstructed residual BPU 222. The encoder can add reconstructed residual BPU 222 to predicted BPU 208 to generate prediction reference 224, which is used in prediction stage 204 for the next iteration of process 200A. Components 218, 220, 222, and 224 of process 200A can be referred to as a "reconstruction path." The reconstruction path can be used to ensure that both the encoder and the decoder use the same reference data for prediction.

The encoder can perform process 200A iteratively to encode each original BPU of the original picture (in the forward path) and generate predicted reference 224 for encoding the next original BPU of the original picture (in the reconstruction path). After encoding all original BPUs of the original picture, the encoder can proceed to encode the next picture in video sequence 202.

Referring to process 200A, the encoder can receive video sequence 202 generated by a video capturing device (e.g., a camera). The term "receive" used herein can refer to receiving, inputting, acquiring, retrieving, obtaining, reading, accessing, or any action in any manner for inputting data.

At prediction stage 204, at a current iteration, the encoder can receive an original BPU and prediction reference 224, and perform a prediction operation to generate prediction data 206 and predicted BPU 208. Prediction reference 224 can be generated from the reconstruction path of the previous iteration of process 200A. The purpose of prediction stage 204 is to reduce information redundancy by extracting prediction data 206 that can be used to reconstruct the original BPU as predicted BPU 208 from prediction data 206 and prediction reference 224.

Ideally, predicted BPU 208 can be identical to the original BPU. However, due to non-ideal prediction and reconstruction operations, predicted BPU 208 is generally slightly different from the original BPU. For recording such differences, after generating predicted BPU 208, the encoder can subtract it from the original BPU to generate residual BPU 210. For example, the encoder can subtract values (e.g., greyscale values or RGB values) of pixels of predicted BPU 208 from values of corresponding pixels of the original BPU. Each pixel of residual BPU 210 can have a residual value as a result of such subtraction between the corresponding pixels of the original BPU and predicted BPU 208. Compared with the original BPU, prediction data 206 and residual BPU 210 can have fewer bits, but they can be used to reconstruct the original BPU without significant quality deterioration. Thus, the original BPU is compressed.

To further compress residual BPU 210, at transform stage 212, the encoder can reduce spatial redundancy of residual BPU 210 by decomposing it into a set of two-dimensional "base patterns," each base pattern being associated with a "transform coefficient." The base patterns can have the same size (e.g., the size of residual BPU 210). Each base pattern can represent a variation frequency (e.g., frequency of brightness variation) component of residual BPU 210. None of the base patterns can be reproduced from any combinations (e.g., linear combinations) of any other base patterns. In other words, the decomposition can decompose variations of residual BPU 210 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 212, such as, for example, a discrete cosine transform, a discrete sine transform, or the like. The transform at transform stage 212 is invertible. That is, the encoder can restore residual BPU 210 by an inverse operation of the transform (referred to as an "inverse transform"). For example, to restore a pixel of residual BPU 210, the inverse transform can be multiplying values of corresponding pixels of the base patterns by respective associated coefficients and adding the products to produce a weighted sum. For a video coding standard, both the encoder and decoder can use the same transform algorithm (thus the same base patterns). Thus, the encoder can record only the transform coefficients, from which the decoder can reconstruct residual BPU 210 without receiving the base patterns from the encoder. Compared with residual BPU 210, the transform coefficients can have fewer bits, but they can be used to reconstruct residual BPU 210 without significant quality deterioration. Thus, residual BPU 210 is further compressed.

The encoder can further compress the transform coefficients at quantization stage 214. In the transform process, different base patterns can represent different variation frequencies (e.g., brightness variation frequencies). Because human eyes are generally better at recognizing low-frequency variation, the encoder can disregard information of high-frequency variation without causing significant quality deterioration in decoding. For example, at quantization stage 214, the encoder can generate quantized transform coefficients 216 by dividing each transform coefficient by an integer value (referred to as a "quantization parameter") and rounding the quotient to its nearest integer. After such an operation, some transform coefficients of the high-frequency base patterns can be converted to zero, and the transform coefficients of the low-frequency base patterns can be converted to smaller integers. The encoder can disregard the zero-value quantized transform coefficients 216, by which the transform coefficients are further compressed. The quantization process is also invertible, in which quantized transform coefficients 216 can be reconstructed to the transform coefficients in an inverse operation of the quantization (referred to as "inverse quantization").

Because the encoder disregards the remainders of such divisions in the rounding operation, quantization stage 214 can be lossy. Typically, quantization stage 214 can contribute the most information loss in process 200A. The larger the information loss is, the fewer bits the quantized transform coefficients 216 can need. For obtaining different levels of information loss, the encoder can use different values of the quantization parameter or any other parameter of the quantization process.

At binary coding stage 226, the encoder can encode prediction data 206 and quantized transform coefficients 216 using a binary coding technique, such as, for example, entropy coding, variable length coding, arithmetic coding, Huffman coding, context-adaptive binary arithmetic coding, or any other lossless or lossy compression algorithm. In some embodiments, besides prediction data 206 and quantized transform coefficients 216, the encoder can encode other information at binary coding stage 226, such as, for example, a prediction mode used at prediction stage 204, parameters of the prediction operation, a transform type at transform stage 212, parameters of the quantization process (e.g., quantization parameters), an encoder control parameter (e.g., a bitrate control parameter), or the like. The encoder can use the output data of binary coding stage 226 to generate video bitstream 228. In some embodiments, video bitstream 228 can be further packetized for network transmission.

Referring to the reconstruction path of process 200A, at inverse quantization stage 218, the encoder can perform inverse quantization on quantized transform coefficients 216 to generate reconstructed transform coefficients. At inverse transform stage 220, the encoder can generate reconstructed residual BPU 222 based on the reconstructed transform coefficients. The encoder can add reconstructed residual BPU 222 to predicted BPU 208 to generate prediction reference 224 that is to be used in the next iteration of process 200A.

It should be noted that other variations of the process 200A can be used to encode video sequence 202. In some embodiments, stages of process 200A can be performed by the encoder in different orders. In some embodiments, one or more stages of process 200A can be combined into a single stage. In some embodiments, a single stage of process 200A can be divided into multiple stages. For example, transform stage 212 and quantization stage 214 can be combined into a single stage. In some embodiments, process 200A can include additional stages. In some embodiments, process 200A can omit one or more stages in FIG. 2A.

Figure 2B:
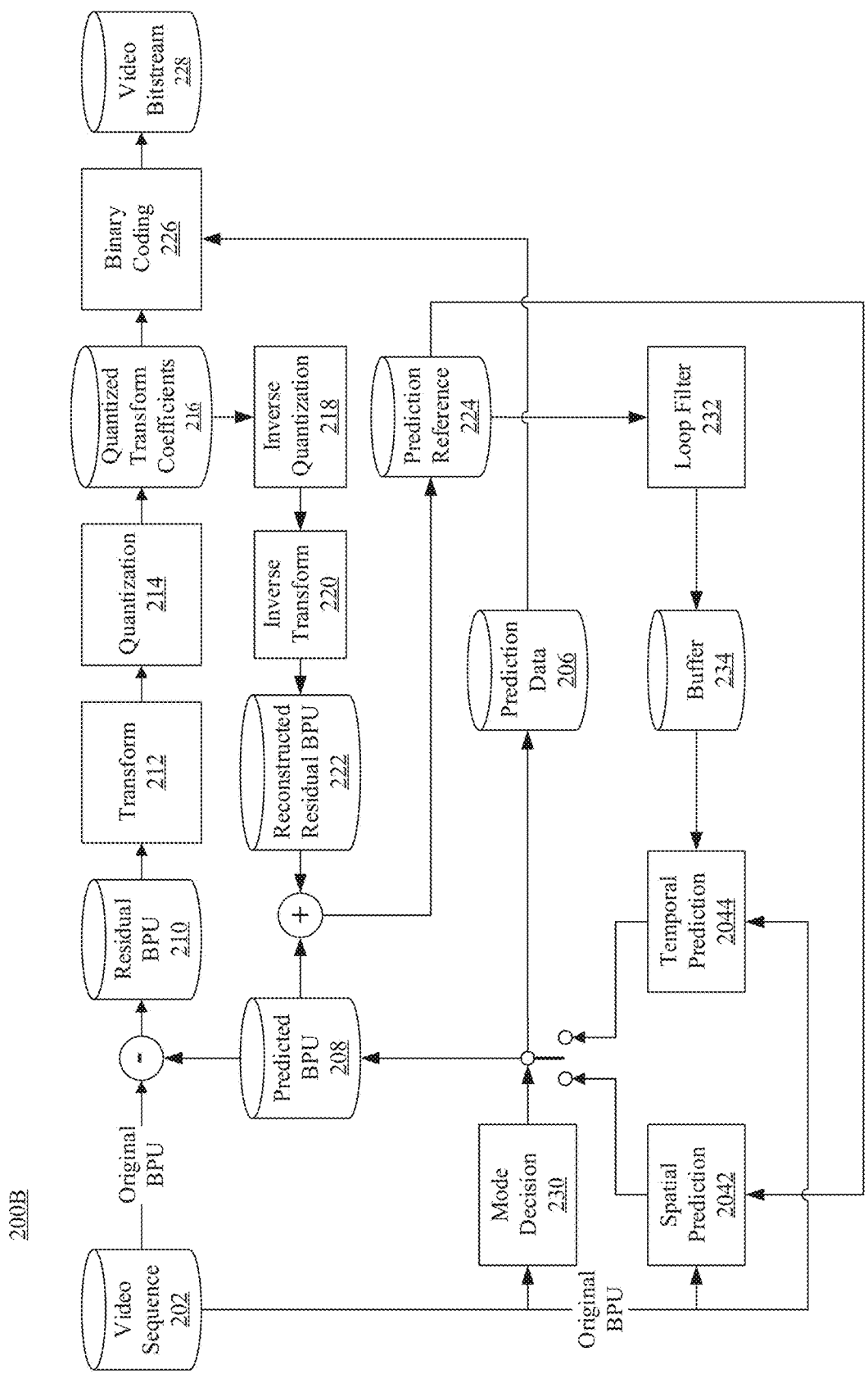
FIG. 2B illustrates a schematic diagram of another example encoding process for video processing based on spatial or temporal importance, according to some embodiments of this disclosure.

FIG. 2B illustrates a schematic diagram of another example encoding process 200B for video processing based on spatial or temporal importance, according to some embodiments of this disclosure. Process 200B can be modified from process 200A. For example, process 200B can be used by an encoder conforming to a hybrid video coding standard (e.g., H.26x series). Compared with process 200A, the forward path of process 200B additionally includes mode decision stage 230 and divides prediction stage 204 into spatial prediction stage 2042 and temporal prediction stage 2044. The reconstruction path of process 200B additionally includes loop filter stage 232 and buffer 234.

Generally, prediction techniques can be categorized into two types: spatial prediction and temporal prediction. Spatial prediction (e.g., an intra-picture prediction or "intra prediction") can use pixels from one or more already coded neighboring BPUs in the same picture to predict the current BPU. That is, prediction reference 224 in the spatial prediction can include the neighboring BPUs. The spatial prediction can reduce the inherent spatial redundancy of the picture. Temporal prediction (e.g., an inter-picture prediction or "inter prediction") can use regions from one or more already coded pictures to predict the current BPU. That is, prediction reference 224 in the temporal prediction can include the coded pictures. The temporal prediction can reduce the inherent temporal redundancy of the pictures.

Referring to process 200B, in the forward path, the encoder performs the prediction operation at spatial prediction stage 2042 and temporal prediction stage 2044. For example, at spatial prediction stage 2042, the encoder can perform the intra prediction. For an original BPU of a picture being encoded, prediction reference 224 can include one or more neighboring BPUs that have been encoded (in the forward path) and reconstructed (in the reconstructed path) in the same picture. The encoder can generate predicted BPU 208 by extrapolating the neighboring BPUs. The extrapolation technique can include, for example, a linear extrapolation or interpolation, a polynomial extrapolation or interpolation, or the like. In some embodiments, the encoder can perform the extrapolation at the pixel level, such as by extrapolating values of corresponding pixels for each pixel of predicted BPU 208. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 206 can include, for example, locations (e.g., coordinates) of the used neighboring BPUs, sizes of the used neighboring BPUs, parameters of the extrapolation, a direction of the used neighboring BPUs with respect to the original BPU, or the like.

For another example, at temporal prediction stage 2042, the encoder can perform the inter prediction. For an original BPU of a current picture, prediction reference 224 can include one or more pictures (referred to as "reference pictures") that have been encoded (in the forward path) and reconstructed (in the reconstructed path). In some embodiments, a reference picture can be encoded and reconstructed BPU by BPU. For example, the encoder can add reconstructed residual BPU 222 to predicted BPU 208 to generate a reconstructed BPU. When all reconstructed BPUs of the same picture are generated, the encoder can generate a reconstructed picture as a reference picture. The encoder can perform an operation of "motion estimation" to search for a matching region in a scope (referred to as a "search window") of the reference picture. The location of the search window in the reference picture can be determined based on the location of the original BPU in the current picture. For example, the search window can be centered at a location having the same coordinates in the reference picture as the original BPU in the current picture and can be extended out for a predetermined distance. When the encoder identifies (e.g., by using a pel-recursive algorithm, a block-matching algorithm, or the like) a region similar to the original BPU in the search window, the encoder can determine such a region as the matching region. The matching region can have different dimensions (e.g., being smaller than, equal to, larger than, or in a different shape) from the original BPU. Because the reference picture and the current picture are temporally separated in the timeline (e.g., as shown in FIG. 1), it can be deemed that the matching region "moves" to the location of the original BPU as time goes by. The encoder can record the direction and distance of such a motion as a "motion vector." When multiple reference pictures are used (e.g., as picture 106 in FIG. 1), the encoder can search for a matching region and determine its associated motion vector for each reference picture. In some embodiments, the encoder can assign weights to pixel values of the matching regions of respective matching reference pictures.

The motion estimation can be used to identify various types of motions, such as, for example, translations, rotations, zooming, or the like. For inter prediction, prediction data 206 can include, for example, locations (e.g., coordinates) of the matching region, the motion vectors associated with the matching region, the number of reference pictures, weights associated with the reference pictures, or the like.

For generating predicted BPU 208, the encoder can perform an operation of "motion compensation." The motion compensation can be used to reconstruct predicted BPU 208 based on prediction data 206 (e.g., the motion vector) and prediction reference 224. For example, the encoder can move the matching region of the reference picture according to the motion vector, in which the encoder can predict the original BPU of the current picture. When multiple reference pictures are used (e.g., as picture 106 in FIG. 1), the encoder can move the matching regions of the reference pictures according to the respective motion vectors and average pixel values of the matching regions. In some embodiments, if the encoder has assigned weights to pixel values of the matching regions of respective matching reference pictures, the encoder can add a weighted sum of the pixel values of the moved matching regions.

In some embodiments, the inter prediction can be unidirectional or bidirectional. Unidirectional inter predictions can use one or more reference pictures in the same temporal direction with respect to the current picture. For example, picture 104 in FIG. 1 is a unidirectional inter-predicted picture, in which the reference picture (i.e., picture 102) precedes picture 104. Bidirectional inter predictions can use one or more reference pictures at both temporal directions with respect to the current picture. For example, picture 106 in FIG. 1 is a bidirectional inter-predicted picture, in which the reference pictures (i.e., pictures 104 and 108) are at both temporal directions with respect to picture 104.

Still referring to the forward path of process 200B, after spatial prediction stage 2042 and temporal prediction stage 2044, at mode decision stage 230, the encoder can select a prediction mode (e.g., one of the intra prediction or the inter prediction) for the current iteration of process 200B. For example, the encoder can perform a rate-distortion optimization technique, in which the encoder can select a prediction mode to minimize a value of a cost function depending on a bitrate of a candidate prediction mode and distortion of the reconstructed reference picture under the candidate prediction mode. Depending on the selected prediction mode, the encoder can generate the corresponding predicted BPU 208 and predicted data 206.

In the reconstruction path of process 200B, if intra prediction mode has been selected in the forward path, after generating prediction reference 224 (e.g., the current BPU that has been encoded and reconstructed in the current picture), the encoder can directly feed prediction reference 224 to spatial prediction stage 2042 for later usage (e.g., for extrapolation of a next BPU of the current picture). If the inter prediction mode has been selected in the forward path, after generating prediction reference 224 (e.g., the current picture in which all BPUs have been encoded and reconstructed), the encoder can feed prediction reference 224 to loop filter stage 232, at which the encoder can apply a loop filter to prediction reference 224 to reduce or eliminate distortion (e.g., blocking artifacts) introduced by the inter prediction. The encoder can apply various loop filter techniques at loop filter stage 232, such as, for example, deblocking, sample adaptive offsets, adaptive loop filters, or the like. The loop-filtered reference picture can be stored in buffer 234 (or "decoded picture buffer") for later use (e.g., to be used as an inter-prediction reference picture for a future picture of video sequence 202). The encoder can store one or more reference pictures in buffer 234 to be used at temporal prediction stage 2044. In some embodiments, the encoder can encode parameters of the loop filter (e.g., a loop filter strength) at binary coding stage 226, along with quantized transform coefficients 216, prediction data 206, and other information.

Figure 3A:
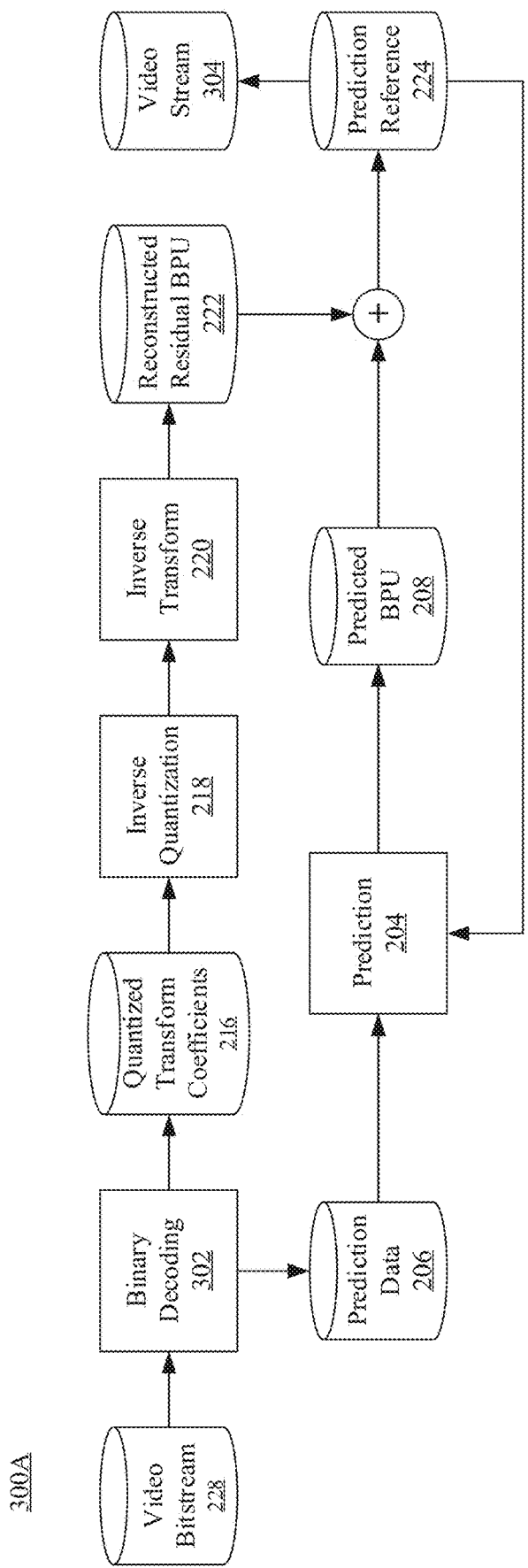
FIG. 3A illustrates a schematic diagram of an example decoding process for video processing based on spatial or temporal importance, according to some embodiments of this disclosure.

FIG. 3A illustrates a schematic diagram of an example decoding process 300A for video processing based on spatial or temporal importance, according to some embodiments of this disclosure. Process 300A can be a decompression process corresponding to the compression process 200A in FIG. 2A. In some embodiments, process 300A can be similar to the reconstruction path of process 200A. A decoder can decode video bitstream 228 into video stream 304 according to process 300A. Video stream 304 can be very similar to video sequence 202. However, due to the information loss in the compression and decompression process (e.g., quantization stage 214 in FIGS. 2A-2B), generally, video stream 304 is not identical to video sequence 202. Similar to processes 200A and 200B in FIGS. 2A-2B, the decoder can perform process 300A at the level of basic processing units (BPUs) for each picture encoded in video bitstream 228. For example, the decoder can perform process 300A in an iterative manner, in which the decoder can decode a basic processing unit in one iteration of process 300A. In some embodiments, the decoder can perform process 300A in parallel for regions (e.g., regions 114-118) of each picture encoded in video bitstream 228.

In FIG. 3A, the decoder can feed a portion of video bitstream 228 associated with a basic processing unit (referred to as an "encoded BPU") of an encoded picture to binary decoding stage 302. At binary decoding stage 302, the decoder can decode the portion into prediction data 206 and quantized transform coefficients 216. The decoder can feed quantized transform coefficients 216 to inverse quantization stage 218 and inverse transform stage 220 to generate reconstructed residual BPU 222. The decoder can feed prediction data 206 to prediction stage 204 to generate predicted BPU 208. The decoder can add reconstructed residual BPU 222 to predicted BPU 208 to generate predicted reference 224. In some embodiments, predicted reference 224 can be stored in a buffer (e.g., a decoded picture buffer in a computer memory). The decoder can feed predicted reference 224 to prediction stage 204 for performing a prediction operation in the next iteration of process 300A.

The decoder can perform process 300A iteratively to decode each encoded BPU of the encoded picture and generate predicted reference 224 for encoding the next encoded BPU of the encoded picture. After decoding all encoded BPUs of the encoded picture, the decoder can output the picture to video stream 304 for display and proceed to decode the next encoded picture in video bitstream 228.

At binary decoding stage 302, the decoder can perform an inverse operation of the binary coding technique used by the encoder (e.g., entropy coding, variable length coding, arithmetic coding, Huffman coding, context-adaptive binary arithmetic coding, or any other lossless compression algorithm). In some embodiments, besides prediction data 206 and quantized transform coefficients 216, the decoder can decode other information at binary decoding stage 302, such as, for example, a prediction mode, parameters of the prediction operation, a transform type, parameters of the quantization process (e.g., quantization parameters), an encoder control parameter (e.g., a bitrate control parameter), or the like. In some embodiments, if video bitstream 228 is transmitted over a network in packets, the decoder can depacketize video bitstream 228 before feeding it to binary decoding stage 302.

Figure 3B:
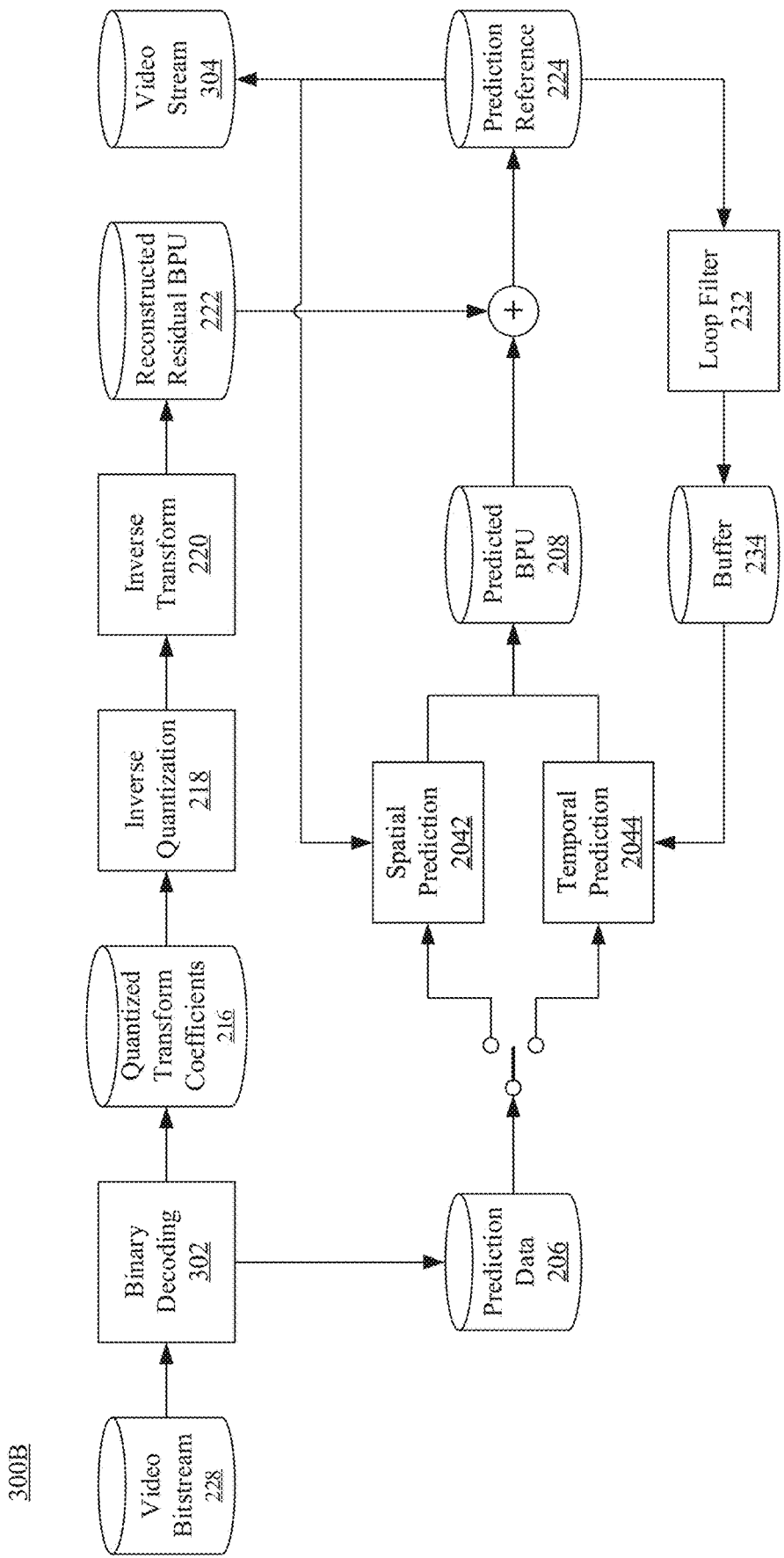
FIG. 3B illustrates a schematic diagram of another example decoding process for video processing based on spatial or temporal importance, according to some embodiments of this disclosure.

FIG. 3B illustrates a schematic diagram of another example decoding process 300B for video processing based on spatial or temporal importance, according to some embodiments of this disclosure. Process 300B can be modified from process 300A. For example, process 300B can be used by a decoder conforming to a hybrid video coding standard (e.g., H.26x series). Compared with process 300A, process 300B additionally divides prediction stage 204 into spatial prediction stage 2042 and temporal prediction stage 2044, and additionally includes loop filter stage 232 and buffer 234.

In process 300B, for an encoded basic processing unit (referred to as a "current BPU") of an encoded picture (referred to as a "current picture") that is being decoded, prediction data 206 decoded from binary decoding stage 302 by the decoder can include various types of data, depending on what prediction mode was used to encode the current BPU by the encoder. For example, if intra prediction was used by the encoder to encode the current BPU, prediction data 206 can include a prediction mode indicator (e.g., a flag value) indicative of the intra prediction, parameters of the intra prediction operation, or the like. The parameters of the intra prediction operation can include, for example, locations (e.g., coordinates) of one or more neighboring BPUs used as a reference, sizes of the neighboring BPUs, parameters of extrapolation, a direction of the neighboring BPUs with respect to the original BPU, or the like. For another example, if inter prediction was used by the encoder to encode the current BPU, prediction data 206 can include a prediction mode indicator (e.g., a flag value) indicative of the inter prediction, parameters of the inter prediction operation, or the like. The parameters of the inter prediction operation can include, for example, the number of reference pictures associated with the current BPU, weights respectively associated with the reference pictures, locations (e.g., coordinates) of one or more matching regions in the respective reference pictures, one or more motion vectors respectively associated with the matching regions, or the like.

Based on the prediction mode indicator, the decoder can decide whether to perform a spatial prediction (e.g., the intra prediction) at spatial prediction stage 2042 or a temporal prediction (e.g., the inter prediction) at temporal prediction stage 2044. The details of performing such spatial prediction or temporal prediction are described in FIG. 2B and will not be repeated hereinafter. After performing such spatial prediction or temporal prediction, the decoder can generate predicted BPU 208. The decoder can add predicted BPU 208 and reconstructed residual BPU 222 to generate prediction reference 224, as described in FIG. 3A.

In process 300B, the decoder can feed predicted reference 224 to spatial prediction stage 2042 or temporal prediction stage 2044 for performing a prediction operation in the next iteration of process 300B. For example, if the current BPU is decoded using the intra prediction at spatial prediction stage 2042, after generating prediction reference 224 (e.g., the decoded current BPU), the decoder can directly feed prediction reference 224 to spatial prediction stage 2042 for later usage (e.g., for extrapolation of a next BPU of the current picture). If the current BPU is decoded using the inter prediction at temporal prediction stage 2044, after generating prediction reference 224 (e.g., a reference picture in which all BPUs have been decoded), the encoder can feed prediction reference 224 to loop filter stage 232 to reduce or eliminate distortion (e.g., blocking artifacts). The decoder can apply a loop filter to prediction reference 224, in a way as described in FIG. 2B. The loop-filtered reference picture can be stored in buffer 234 (e.g., a decoded picture buffer in a computer memory) for later use (e.g., to be used as an inter-prediction reference picture for a future encoded picture of video bitstream 228). The decoder can store one or more reference pictures in buffer 234 to be used at temporal prediction stage 2044. In some embodiments, when the prediction mode indicator of prediction data 206 indicates that inter prediction was used to encode the current BPU, prediction data can further include parameters of the loop filter (e.g., a loop filter strength).

Figure 4:
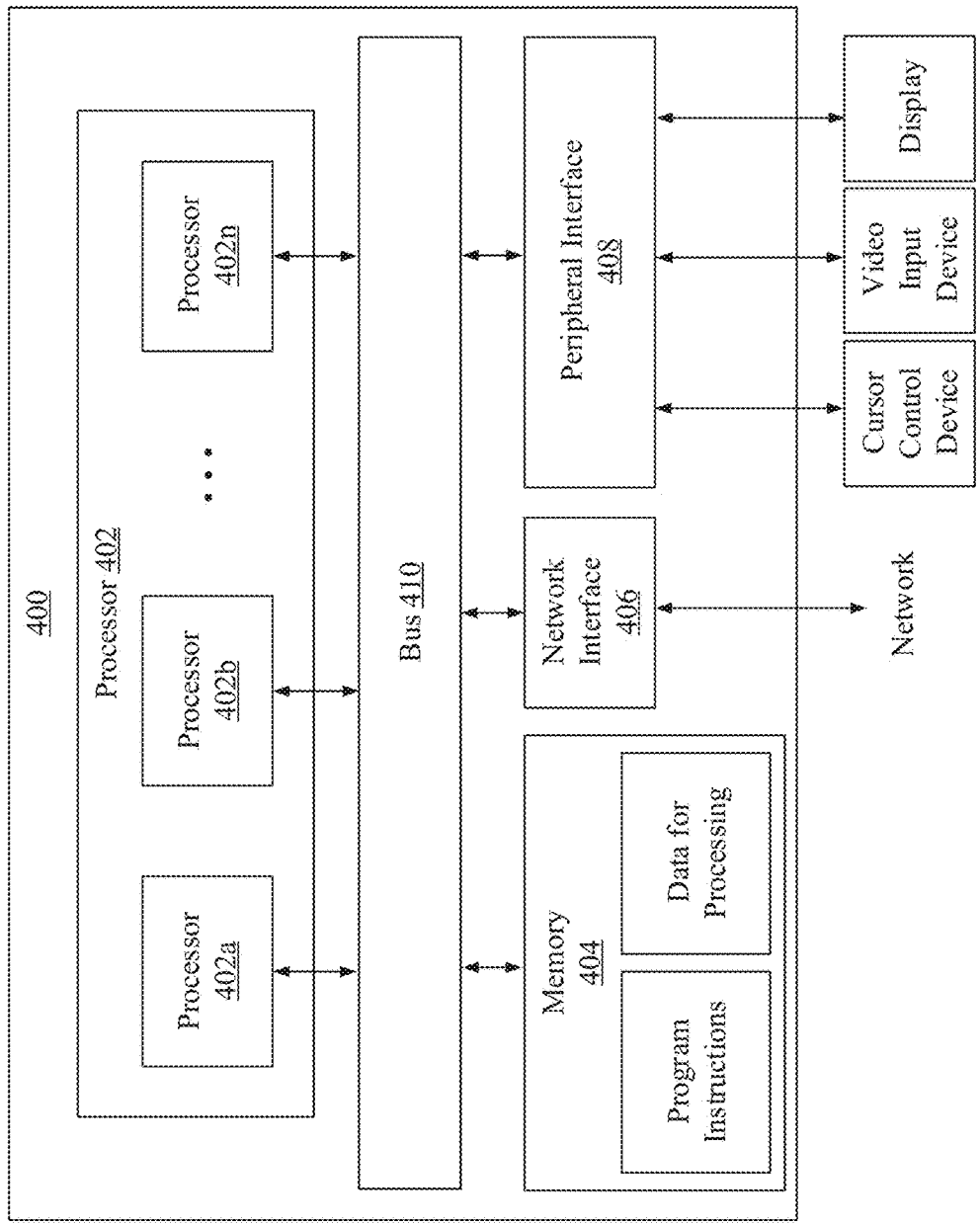
FIG. 4 illustrates a block diagram of an example apparatus for encoding or decoding a video, according to some embodiments of this disclosure.

FIG. 4 is a block diagram of an example apparatus 400 for encoding or decoding a video, according to some embodiments of this disclosure. As shown in FIG. 4, apparatus 400 can include processor 402. When processor 402 executes instructions described herein, apparatus 400 can become a specialized machine for video encoding or decoding. Processor 402 can be any type of circuitry capable of manipulating or processing information. For example, processor 402 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 402 can also be a set of processors grouped as a single logical component. For example, as shown in FIG. 4, processor 402 can include multiple processors, including processor 402a, processor 402b, and processor 402n.

Apparatus 400 can also include memory 404 configured to store data (e.g., a set of instructions, computer codes, intermediate data, or the like). For example, as shown in FIG. 4, the stored data can include program instructions (e.g., program instructions for implementing the stages in processes 200A, 200B, 300A, or 300B) and data for processing (e.g., video sequence 202, video bitstream 228, or video stream 304). Processor 402 can access the program instructions and data for processing (e.g., via bus 410), and execute the program instructions to perform an operation or manipulation on the data for processing. Memory 404 can include a high-speed random-access storage device or a non-volatile storage device. In some embodiments, memory 404 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 404 can also be a group of memories (not shown in FIG. 4) grouped as a single logical component.

Bus 410 can be a communication device that transfers data between components inside apparatus 400, such as an internal bus (e.g., a CPU-memory bus), an external bus (e.g., a universal serial bus port, a peripheral component interconnect express port), or the like.

For ease of explanation without causing ambiguity, processor 402 and other data processing circuits are collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 400.

Apparatus 400 can further include network interface 406 to provide wired or wireless communication with a network (e.g., the Internet, an intranet, a local area network, a mobile communications network, or the like). In some embodiments, network interface 406 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, an near-field communication ("NFC") adapter, a cellular network chip, or the like.

In some embodiments, optionally, apparatus 400 can further include peripheral interface 408 to provide a connection to one or more peripheral devices. As shown in FIG. 4, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface coupled to a video archive), or the like.

It should be noted that video codecs (e.g., a codec performing process 200A, 200B, 300A, or 300B) can be implemented as any combination of any software or hardware modules in apparatus 400. For example, some or all stages of process 200A, 200B, 300A, or 300B can be implemented as one or more software modules of apparatus 400, such as program instructions that can be loaded into memory 404. For another example, some or all stages of process 200A, 200B, 300A, or 300B can be implemented as one or more hardware modules of apparatus 400, such as a specialized data processing circuit (e.g., an FPGA, an ASIC, an NPU, or the like).

FIG. 5A is a schematic diagram illustrating an example picture 500A of a video, according to some embodiments of this disclosure. Picture 500A shows a vehicle driving in an urban environment, where the vehicle is in the foreground. The background includes buildings, streets, trees, clouds, or the like. Typically, a viewer of picture 500A can be attentive to a region 502 (indicated by dashed lines) that includes the vehicle in the foreground, and be less attentive to the background of picture 500A. That is, region 502 can be an ROI for the viewer.

Many existing resolution-enhancement techniques can only apply a resolution enhancement (or "upscaling") technique to picture 500A in entirety, in which region 502 and the background are enhanced by the same resolution-enhancement technique. FIG. 5B is a schematic diagram illustrating an example picture 500B enhanced from picture 500A using a first resolution-enhancement technique, according to some embodiments of this disclosure. The first resolution-enhancement technique can prioritize preserving the image quality (referred to as "enhancement quality") of picture 500B. For example, the first resolution-enhancement technique can be a complex resolution-enhancement technique (e.g., a learning-based technique), in which the processing speed can be very slow, and the computational costs (e.g., computing cycles of a CPU or GPU) can be very high. FIG. 5C is a schematic diagram illustrating an example picture 500C enhanced from picture 500A using a second resolution-enhancement technique, according to some embodiments of this disclosure. The second resolution-enhancement technique can prioritize a high processing speed. For example, the second resolution-enhancement technique can be a less complex resolution-enhancement technique (e.g., an interpolation-based technique), in which the enhancement quality can be low and unacceptable to the viewer. It is very challenging to keep both the enhancement quality and the processing speed at preferred levels by applying the resolution-enhancement technique to a picture in entirety.

Figure 6:
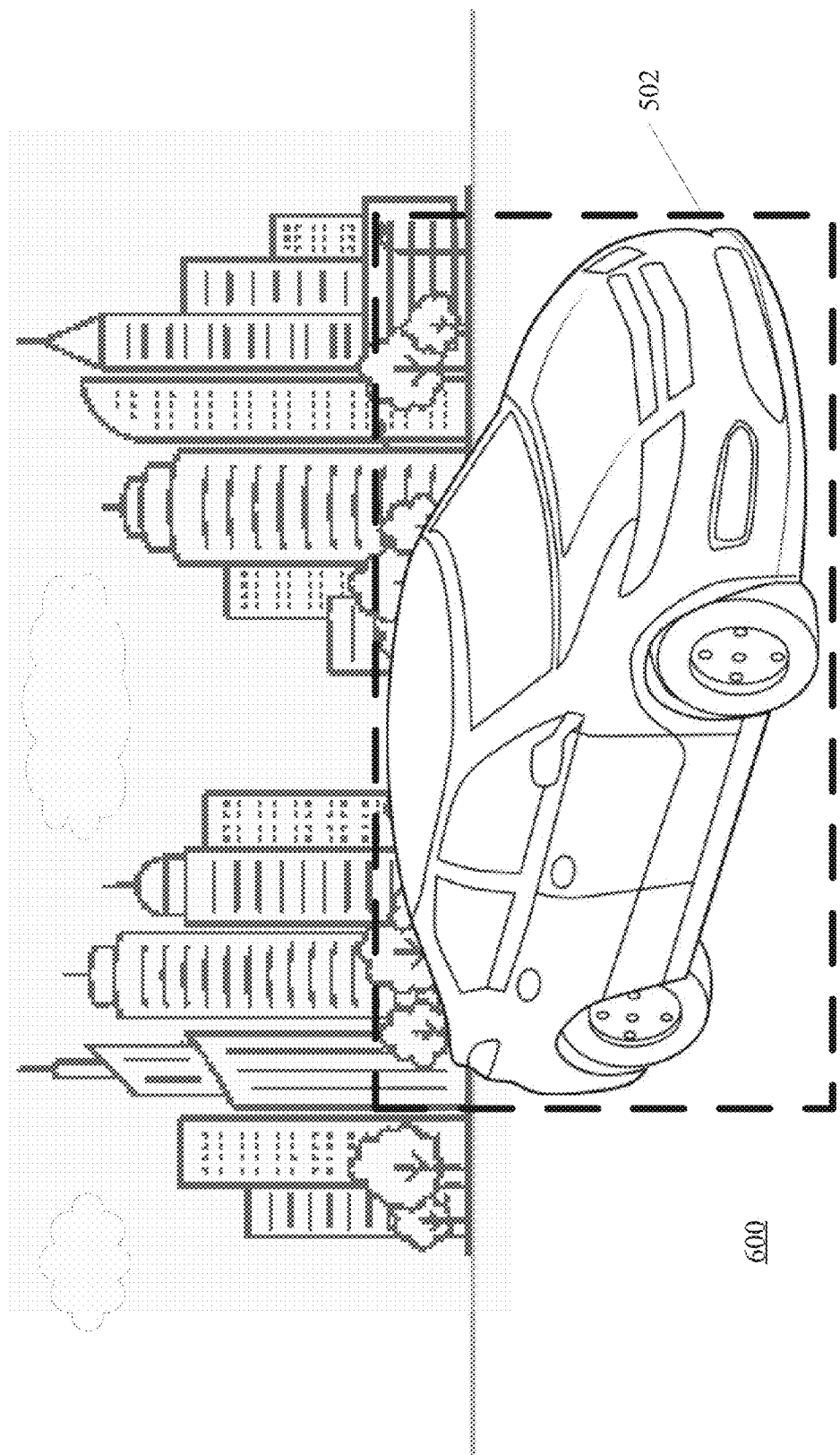
FIG. 6 is a schematic diagram illustrating an example picture enhanced from the picture of FIG. 5A using a resolution-enhancement technique based on spatial importance, according to some embodiments of this disclosure.

FIG. 6 is a schematic diagram illustrating an example picture 600 enhanced from picture 500A using a resolution-enhancement technique based on spatial importance, according to some embodiments of this disclosure. When performing the enhancement operation, region 502 can be detected and identified as having high spatial importance (e.g., as an ROI), then enhanced using a complex resolution-enhancement technique (e.g., a DNN-based technique). The background can be detected and identified as having low spatial importance, then enhanced using a fast resolution-enhancement technique (e.g., a bicubic interpolation technique). As a result, the image quality of region 502 can be preserved at a higher level (e.g., being clear and smooth), and the overall processing speed of picture 600 can be controlled at a higher level as well because the background of picture 600 is processed using a fast resolution-enhancement technique. Thereby, both the enhancement quality and the processing speed can be maintained at preferred levels.

FIGS. 7-11 illustrate schematic diagrams illustrating example processes 700-1100 of video processing, according to some embodiments of this disclosure. In some embodiments, process 700-1100 can be performed by a codec (e.g., an encoder in FIGS. 2A-2B or a decoder in FIGS. 3A-3B). For example, the codec can be implemented as one or more software or hardware components of an apparatus (e.g., apparatus 400) for encoding or transcoding a video sequence. In some embodiments, the video sequence can be an uncompressed video sequence (e.g., video sequence 202) or a compressed video sequence that is decoded (e.g., video stream 304). In some embodiments, the video sequence can be a video sequence captured by a video input device (e.g., the video input device in FIG. 4) associated with a processor (e.g., processor 402) of the apparatus. In some embodiments, the apparatus can perform process 700-1100 at the level of picture portions. For example, a picture portion can be a BPU (e.g., basic processing unit 112 in FIG. 1), a basic processing sub-unit as described in FIG. 1, or a region such as any of region 114, 116, or 118 (e.g., a slice or tile in H.265/HEVC and H.266/VVC). For ease of explanation without causing ambiguity, the picture portion is referred to as a "region" hereinafter unless expressly stated otherwise.

Figure 7:
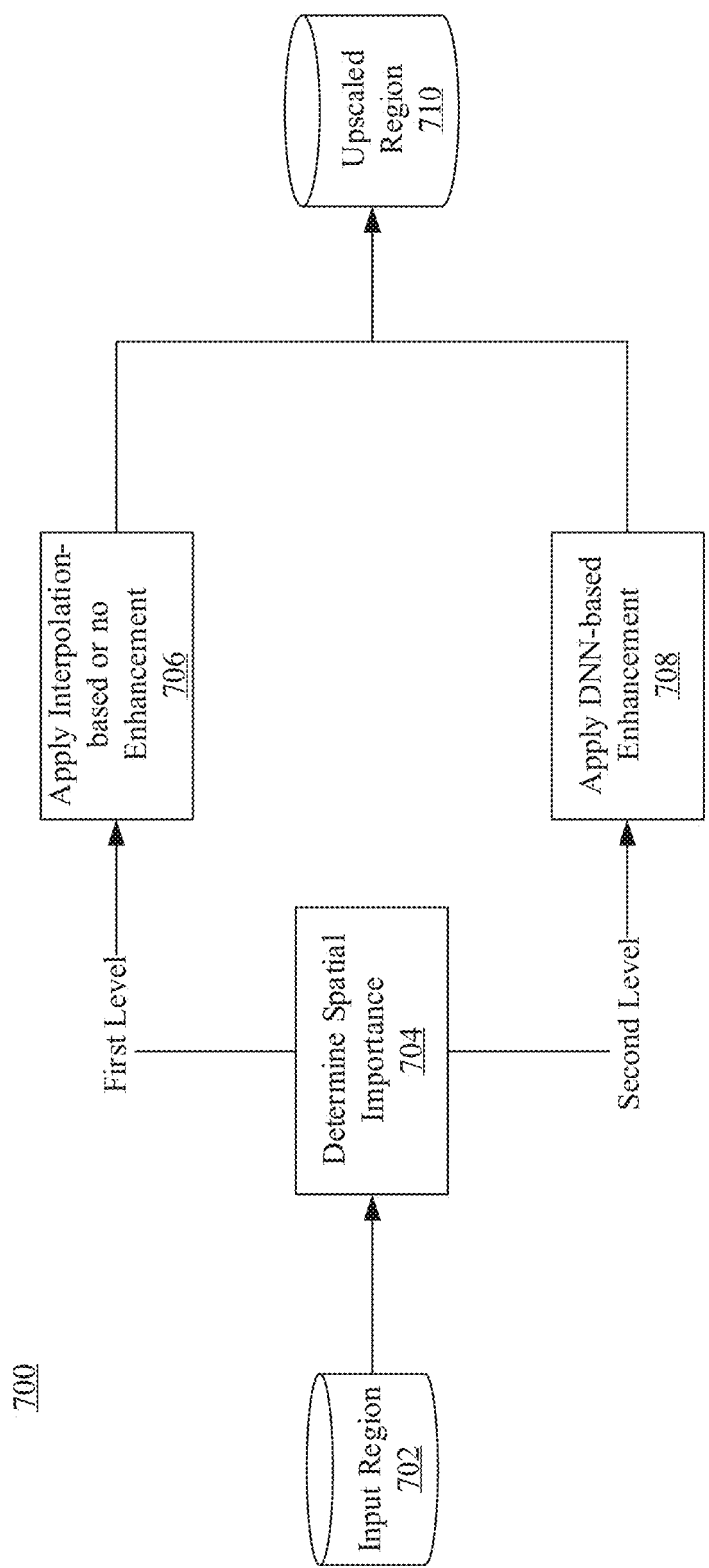
FIG. 7 illustrates a schematic diagram illustrating an example process of video processing, according to some embodiments of this disclosure.

FIG. 7 illustrates a schematic diagram illustrating an example process 700 of video processing, according to some embodiments of this disclosure. In FIG. 7, input region 702 of a picture is fed to stage 704, where the spatial importance of input region 702 can be determined. In some embodiments, input region 702 can be a BPU (e.g., BPU 112 in FIG. 1), a portion of the picture (e.g., region 114, 116, or 118), or the picture itself. The picture can be a current picture in an encoding process (e.g., process 200A or 200B) or a decoding process (e.g., process 300A or 300B). For example, if the picture is a current picture in the encoding process, process 700 can be performed before prediction stage 204 in FIGS. 2A-2B. For another example, if the picture is a current picture in the decoding process, process 700 can be performed after generating prediction reference 224 for display in FIGS. 3A-3B.

The spatial importance can be determined by various image processing techniques, such as, for example, an object detection technique, an image segmentation technique (e.g., a semantic segmentation technique or an instance segmentation technique), or any suitable computer vision technique. In some embodiments, the image segmentation technique can be implemented based on region-based threshold segmentation, edge-detection segmentation, clustering-based segmentation, segmentation using a mask RNN, or the like.

For example, the object detection technique can identify a bounding region (e.g., a rectangular box) in the picture, which encloses an identified object. Based on whether input region 702 is in the bounding region, a spatial importance level can be assigned to input region 702. For example, a value of 0 for the spatial importance level can represent that input region 702 is in or crossing the bounding region, and a value of 1 for the spatial importance level can represent that input region 702 is out of the bounding region.

For another example, if the semantic segmentation technique is used at stage 704, each pixel of the picture can be labeled with a class or label (e.g., a vehicle, an individual, a building, a tree, or any classification of visual contents) of what is represented. Based on whether input region 702 includes pixels associated with one or more classes of interest, the spatial importance level of input region 702 can be determined. Different classes can be predetermined with different spatial importance levels based on how interested a viewer can be of each class. For example, the higher the value of the spatial importance level of a class, the more interested the viewer can be of the class. For example, a class of "background" can be associated with a spatial importance level of 0, a class of "buildings" can be associated with a spatial importance level of 1, a class of "vehicle" can be associated with a spatial importance level of 2, a class of "individuals" can be associated with a spatial importance level of 3, or the like.

For another example, if the instance segmentation technique is used at stage 704, each pixel of an image can be further associated with a label of an instance of objects of the same class. For example, for a class of "individuals," the instance segmentation technique can differentiate and associate each pixel in the class with labels of "person 1," "person 2," and so on. In some embodiments, different instances of the same class can be further determined with different spatial importance levels based on how interested a viewer can be of each instance. For example, the higher the value of the spatial importance level of an instance, the more interested the viewer can be of the instance. For example, if the video is a movie, the spatial importance level associated with a protagonist can be higher than the spatial importance levels associated with supporting roles. In some embodiments, the semantic segmentation technique can be used to determine spatial importance levels of different classes, and the instance segmentation technique can be applied to each class to determine spatial importance levels of different instances in the same class.

In some embodiments, the associations between the classes (or objects) and the spatial importance levels can be assigned by a user before performing stage 704. In some embodiments, such associations can be automatically generated based on collected data. It should be noted that the methods and techniques for determining the spatial importance level of input region 702 can be implemented in other approaches and manners, which is not limited in this disclosure.

Referring back to process 700, after stage 704, based on different spatial importance levels, different operations can be applied to input region 702. As shown in FIG. 7, if the spatial importance level of input region 702 is determined to be a first level, an interpolation-based (e.g., bilinear interpolation or bicubic interpolation) technique can be applied to it at stage 706. Alternatively, input region 702 can be applied with no resolution enhancement at stage 706. If the spatial importance level of input region 702 is determined to be a second level, a DNN-based resolution-enhancement technique can be applied to it at stage 708. The first level can be lower than the second level, in which the viewer may be more likely interested in objects, classes, or instances associated with the second level than those associated with the first level. For example, the first level can represent that input region 702 is part of a background of the picture, and the second level can represent that input region 702 is in or covering an ROI of the picture.

After applying the resolution techniques, upscaled region 710 can be outputted. In process 700, different regions of different spatial importance levels can be upscaled using techniques having different computational complexities. The more important regions (e.g., regions a viewer is more likely interested in) can be upscaled with a computation-intensive resolution-enhancement technique that preserves better quality, and the less important regions (e.g., regions that the viewer is less likely interested in) can be upscaled with a fast resolution-enhancement technique that costs less time and computational resources, by which high subjective visual quality of the upscaled video can be generated at a low computational cost.

Figure 8:
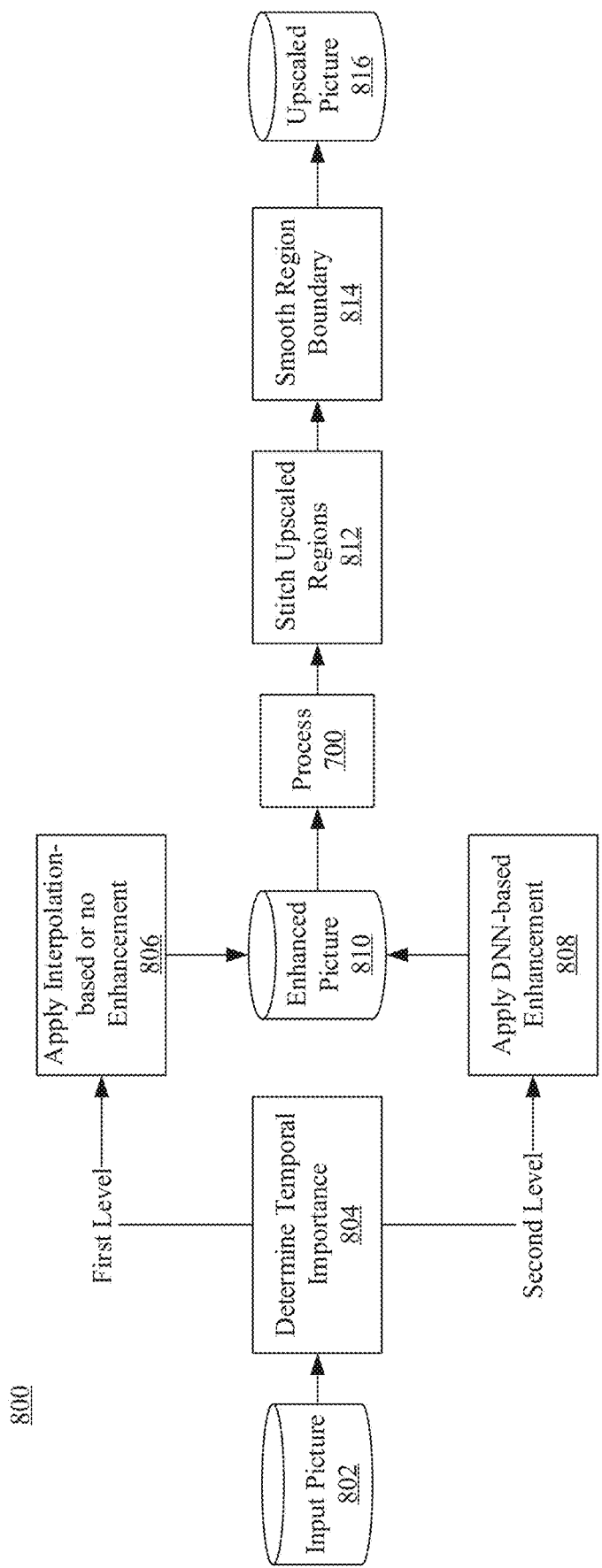
FIG. 8 illustrates a schematic diagram illustrating another example process of video processing, according to some embodiments of this disclosure.

FIG. 8 illustrates a schematic diagram illustrating an example process 800 of video processing, according to some embodiments of this disclosure. Process 800 illustrates an example hierarchical approach of enhancing a video based on temporal importance levels and spatial importance levels. In FIG. 8, input picture 802 is fed to stage 804, where the temporal importance of input picture 802 can be determined. Picture 802 can be a current picture in an encoding process (e.g., process 200A or 200B) or a decoding process (e.g., process 300A or 300B). For example, if picture 802 is a current picture in the encoding process, process 800 can be performed before prediction stage 204 in FIGS. 2A-2B. For another example, if picture 802 is a current picture in the decoding process, process 800 can be performed after generating prediction reference 224 for display in FIGS. 3A-3B.

In some embodiments, the temporal importance can be determined based on a level of impact that input picture 802 has on decoding a video. For example, when being used as a reference picture in inter prediction, an I-picture, a P-picture, and a B-picture can have a high, intermediate, and low level of impact on decoding the video, respectively. In some embodiments, the temporal importance can be determined based on picture types. For example, I-pictures can be associated with a temporal importance level higher than P-pictures and B-pictures. If input picture 802 is an I-picture, the temporal importance level can be determined as 2. If input picture 802 is a P-picture, the temporal importance level can be determined as 1. If input picture 802 is a B-picture, the temporal importance level can be determined as 0.

In some embodiments, the temporal importance can be determined based on a viewer's likely interest in the visual contents of different scenes. For example, scenes of a climax of a movie can have higher temporal importance levels than scenes of transitions of the movies. For another example, scenes of fast actions (e.g., fighting scenes), close-up shots, or stunning visual effects can have higher temporal importance levels than other scenes. In some embodiments, the associations between the pictures and the temporal importance levels can be assigned by a user before performing stage 804. It should be noted that the methods and techniques for determining the temporal importance level of input picture 802 can be implemented in other approaches and manners, which is not limited in this disclosure.

After stage 804, based on different temporal importance levels, different operations can be applied to input picture 802. As shown in FIG. 8, if the temporal importance level of input picture 802 is determined to be a first level, an interpolation-based (e.g., bilinear interpolation or bicubic interpolation) technique can be applied to it at stage 806. Alternatively, input picture 802 can be applied with no resolution enhancement at stage 806. If the temporal importance level of input picture 802 is determined to be a second level, a DNN-based resolution-enhancement technique can be applied to it at stage 808. The first level can be lower than the second level, in which the picture type associated with the second level can have a higher level of impact on decoding the video than the picture type associated with the first level. For example, the first level can represent that input picture 802 is a P-picture or a B-picture, and the second level can represent that input picture 802 is an I-picture.

After applying the resolution techniques, enhanced picture 810 can be generated. Process 700 can be performed on enhanced picture 810 region by region for further enhancing resolutions of its regions (e.g., including input region 702) based on spatial importance levels. In process 700, different regions of different spatial importance levels can be upscaled using techniques having different computational complexities, as described in FIG. 7.

After all regions of enhanced picture 810 are upscaled by process 700, at stage 812, the upscaled regions (e.g., including upscaled region 710) can be stitched to form a stitched picture. For example, feature points of different regions can be detected for matching or aligning the regions. For another example, a Harris detector can be used to find flat portions, edges, or corners of visual contents between regions for stitching. At stage 814, one or more boundaries of the regions of the stitched picture can be smoothened. For another example, a Gaussian blurring can be performed on the boundaries of the stitched regions. It should be noted that the methods and techniques for stitching and smoothening the up scaled regions can be implemented in other approaches and manners, which is not limited in this disclosure.

After stage 814, upscaled picture 816 can be outputted. By applying the hierarchical approach based on temporal importance levels and spatial importance levels, process 800 can further improve the enhancement quality for pictures of a video. In process 800, before enhancing regions based on spatial importance levels as described in process 700, more important pictures (e.g., I-pictures) of a video can be upscaled with a computation-intensive resolution-enhancement technique, and the less important pictures (e.g., B-pictures) of the video can be upscaled with a fast resolution-enhancement technique. Such a two-level resolution enhancement can further preserve the subjective visual quality of the upscaled video without high computational costs.

Figure 9:
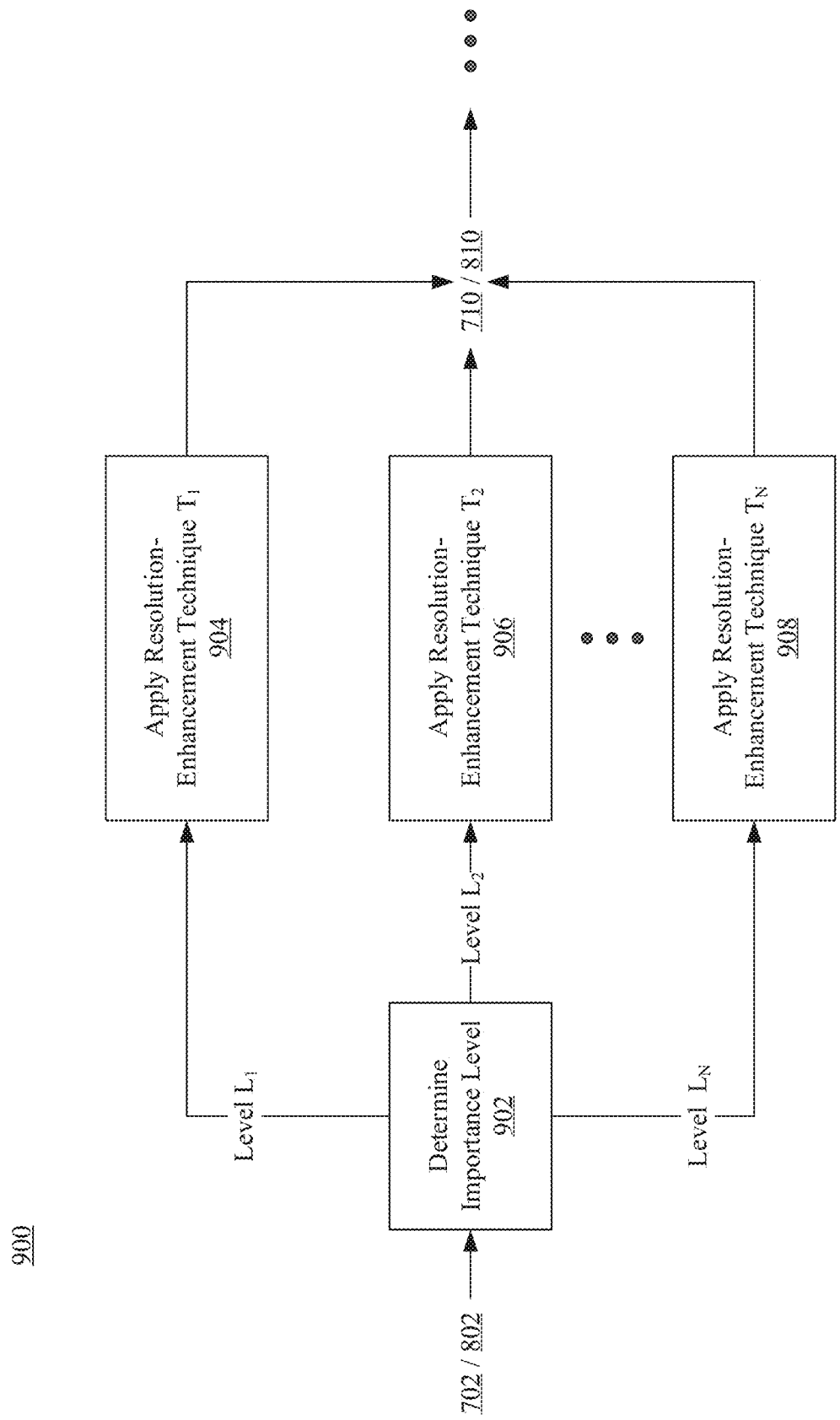
FIG. 9 illustrates a schematic diagram illustrating yet another example process of video processing, according to some embodiments of this disclosure.

FIG. 9 illustrates a schematic diagram illustrating an example process 900 of video processing, according to some embodiments of this disclosure. Process 900 illustrates an example approach of enhancing a video based on more than two temporal importance levels or spatial importance levels. Process 900 can be implemented at a level of regions, as in process 700, or at a level or pictures, as in process 800. In FIG. 9, input region 702 or input picture 802 can be inputted to stage 902 for determining an importance level. For example, stage 902 can be similar to stage 704 for determining a spatial importance level when input region 702 is inputted. For another example, stage 902 can be similar to stage 804 for determining a temporal importance level when input picture 802 is inputted.

After stage 902, based on different importance levels (e.g., temporal importance levels or spatial importance levels), different resolution-enhancement techniques can be applied. As shown in FIG. 9, if the importance level is determined to be $L_1$, a resolution-enhancement technique $T_1$ can be applied at stage 904. If the importance level is determined to be $L_2$, a resolution-enhancement technique $T_2$ can be applied at stage 906. If the importance level is determined to be $L_N$, a resolution-enhancement technique $T_N$ can be applied at stage 908. In FIG. 9, N can be an integer greater than or equal to 3. For example, $L_1$ to $L_N$ can have increasing values indicative of increasing importance levels, and, correspondingly, $T_1$ to $T_N$ can have increasing computational complexities. In some embodiments, importance level $L_1$ can represent that input region 702 or 802 is part of a background of the picture. Importance level $L_N$ can represent that input region 702 or 802 is in or covering an ROI of the picture. Importance levels between $L_1$ and $L_N$ (e.g., importance level $L_2$) can represent that input region 702 or 802 is either part of the background of the picture or in or covering an ROI of the picture.

In some embodiments, resolution-enhancement techniques $T_1$ to $T_N$ can include different types of techniques, such as, for example, interpolation-based techniques, reconstruction-based techniques, or learning-based techniques. For example, resolution-enhancement technique $T_1$ can be an interpolation-based technique (e.g., a bilinear interpolation technique), resolution-enhancement technique $T_2$ can be a reconstruction-based technique, and resolution-enhancement technique $T_N$ can be a learning-based technique (e.g., a DNN-based technique).

In some embodiments, resolution-enhancement techniques $T_1$ to $T_N$ can include the same type of techniques with different levels of computational complexities. For example, resolution-enhancement techniques $T_1$ to $T_N$ can include interpolation-based techniques having different levels of computational complexities, such as bilinear interpolation technique, bicubic interpolation technique, or the like. For another example, resolution-enhancement techniques $T_1$ to $T_N$ can include reconstruction-based techniques having different levels of computational complexities. For another example, resolution-enhancement techniques $T_1$ to $T_N$ can include learning-based techniques having different levels of computational complexities, such as DNN-based techniques having different numbers of hidden layers.

In some embodiments, resolution-enhancement techniques $T_1$ to $T_N$ can include different types of techniques, at least one type of which can include techniques having different levels of computational complexities. It should be noted that resolution-enhancement techniques $T_1$ to $T_N$ can be implemented in other approaches and manners, which is not limited in this disclosure.

After applying the resolution-enhancement techniques at stages 904-908, upscaled region 710 or enhanced picture 810 can be generated, and subsequent operations in process 700 or process 800 can be performed.

In some embodiments, resolution-enhancement techniques $T_1$ to $T_N$ can be automatically determined based on a maximum computational complexity allowed by an apparatus that performs process 900. For example, assuming resolution-enhancement technique $T_N$ has the highest computational complexity among resolution-enhancement techniques $T_1$ to $T_N$ hereinafter, resolution-enhancement technique $T_N$ can be automatically selected as a technique that has the maximum computational complexity allowed by the computational resources of the apparatus. Accordingly, resolution-enhancement techniques $T_1$ to $T_{N-1}$ can be selected automatically, each of which can have a computational complexity lower than resolution-enhancement technique $T_N$.

For example, based on a maximum computational complexity allowed by the apparatus, resolution-enhancement technique $T_N$ can be a DNN-based technique having a first number of hidden layers, in which the first number is the maximum number of hidden layers allowed by the computational resources of the apparatus. Resolution-enhancement techniques $T_1$ to $T_{N-1}$ can be selected from a DNN-based technique having a second number of hidden layers where the second number is smaller than the first number, a reconstruction-based technique, an interpolation-based technique, or a null operation that does not perform any resolution enhancement.

For another example, based on a maximum computational complexity allowed by the apparatus, resolution-enhancement technique $T_N$ can be a reconstruction-based technique. Resolution-enhancement techniques $T_1$ to $T_{N-1}$ can be selected from another reconstruction-based technique having lower computational complexity, an interpolation-based technique, or a null operation that does not perform any resolution enhancement.

In some embodiments, the maximum computational complexity allowed by the apparatus can fluctuate due to fluctuation of the computational resources of the apparatus. Accordingly, resolution-enhancement technique $T_N$ can be selected dynamically to utilize available computational resources maximumly. In some embodiments, when the computational complexity allowed by the apparatus is very limited, resolution-enhancement techniques $T_1$ to $T_{N-1}$ can all be the null operations, and only resolution-enhancement technique $T_N$ that is allowed by the computational resources of the apparatus would be applied to the most important region or picture. It should be noted that the methods and techniques for determining resolution-enhancement techniques based on the maximum computational complexity allowed by the apparatus can be implemented in other approaches and manners, which is not limited in this disclosure.

In some embodiments, in FIGS. 7-9, the spatial importance and temporal importance can be implemented as semantic importance in various techniques. The "semantic importance" can refer to the importance of semantic contents of an image in this disclosure. For example, the semantic importance can represent visual sensitivity of an individual to visual contents of the image. The visual contents can have different levels of computationally determined attractiveness to the individual. For example, the individual may be more sensitive to semantically meaningful contents (e.g., people, animal, moving objects in foreground, or the like), and thus the semantically meaningful objects can have higher levels of computationally determined attractiveness to the individual. As a result, the individual may be more sensitive to the visual quality of the semantically meaningful contents.

In some embodiments, the semantic importance can be determined using a semantic scene understanding technique, in which a written description of a picture can be predicted from image features (e.g., automatically detected objects and attributes) of the picture. In some embodiments, the semantic importance can be determined using a technique for linking visual features to different parts of a speech, in which the semantic importance of the visual features can be associated with the semantic importance of the corresponding parts of the speech. In some embodiments, the semantic importance can be determined using a computational model (e.g., a heuristic model or a machine learning model) of visual saliency. In some embodiments, the semantic importance can be determined based on the memorability of features (e.g., presence, locations, attributes, co-occurrences of objects or individuals, or the like) of pictures. In some embodiments, the semantic importance can be determined based on automatically detected high-level image properties (e.g., photo quality, saliency, attractiveness, composition, color harmony, aesthetics, object importance, or the like) of pictures. In some embodiments, the semantic importance can be determined using a machine learning technique (e.g., a class activation mapping technique).

For example, a computational model of visual saliency can be determined based on the gazing or eyeball fixation of a viewer. For example, an eyeball tracking technique can be used to track where viewers focus on viewing a video. Based on the collected data, the focused regions can be categorized and associated with different spatial importance levels based on the attentive levels of the eyeballs. Such associations can be used for determining the spatial importance levels of regions of other videos of the same type. It should be noted that the methods and techniques for determining the semantic importance of a picture or a region can be implemented in other approaches and manners, which is not limited in this disclosure.

Figure 10:
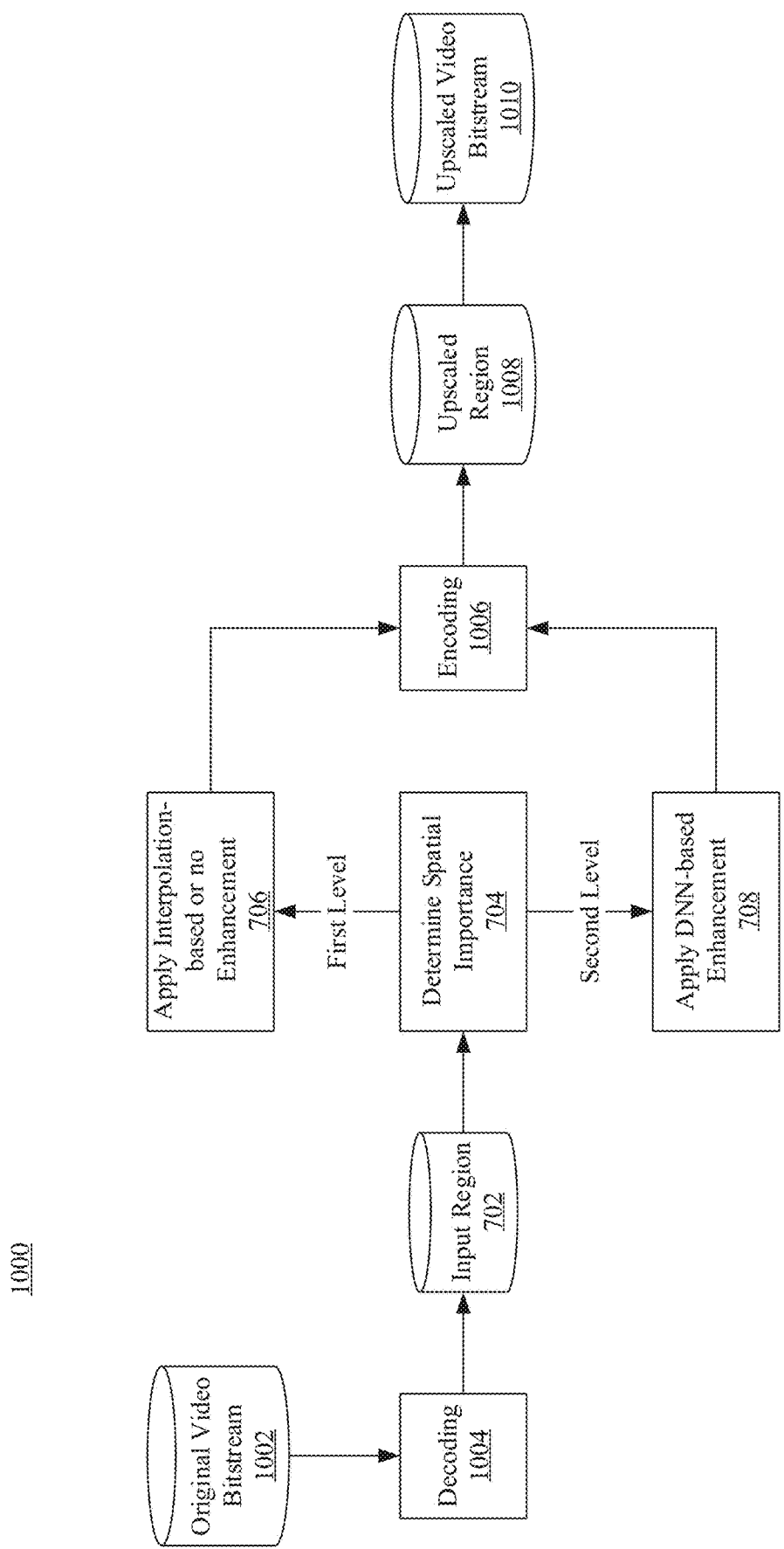
FIG. 10 illustrates a schematic diagram illustrating an example process of video transcoding, according to some embodiments of this disclosure.

FIG. 10 illustrates a schematic diagram illustrating an example process 1000 of video transcoding, according to some embodiments of this disclosure. Process 1000 illustrates an example approach of transcoding a video based on spatial importance levels. Process 1000 includes some stages that are described in FIG. 7, including input region 702 and stages 704-708. In FIG. 10, original video bitstream 1002 is fed to stage 1004 where video bitstream 1002 can be decoded into a video sequence having multiple pictures, including a current picture. The current picture can be a current picture in an encoding process (e.g., process 200A or 200B) or a decoding process (e.g., process 300A or 300B). The current picture can include input region 702. Input region 702 is fed to stage 704, where the spatial importance of input region 702 can be determined.

After stage 704, based on different spatial importance levels (e.g., the first level and the second level), different operations can be applied to input region 702 at stages 706 and 708 for increasing resolution of input region 702 by a scaling factor. The scaling factor can be a ratio by which the number of pixels in the length and width of input region 702 can be upscaled. For example, if input region 702 has a size of 64×32 pixels and the scaling factor is 2 (i.e., the resolution of input region 702 is to be doubled), the resolution of the resolution-enhanced input region 702 would be 128×64 pixels.

At stage 1006, input region 702 applied with the operation can be re-encoded as upscaled region 1008 using a video coding standard (e.g., MPEG family or H.26x family). All upscaled regions of the current picture can be combined to generate upscaled video bitstream 1010.

In some embodiments, at stage 706, if input region 702 is decoded using intra prediction at stage 1004 and is determined to have a first level of spatial importance at stage 704, an interpolation-based (e.g., bilinear interpolation or bicubic interpolation) technique can be applied to input region 702 at stage 706 for increasing resolution of input region 702 by the scaling factor. If input region 702 is decoded using intra prediction at stage 1004 and is determined to have a second level of spatial importance higher than the first level of spatial importance at stage 704, such as input region 702 being in or covering an ROI (e.g., determined based on an image segmentation technique), a DNN-based resolution-enhancement technique can be applied to input region 702 at stage 708 for increasing resolution of input region 702 by the scaling factor.

In some embodiments, when encoding the resolution-enhanced input region 702 at stage 1006 following stage 708, a quantization parameter can be used (e.g., at quantization stage 214 in FIGS. 2A-2B), which can have a value smaller than or equal to a value of an original quantization parameter used by original encoded video bitstream 1002 to encode input region 702. By using such a quantization parameter, input region 702 can be less compressed to further preserve its quality.

In some embodiments, if input region 702 is decoded using inter prediction at stage 1004 and is determined to have the second level of spatial importance at stage 704, input region 702 with its resolution enhanced at stage 708 can be encoded using an inter prediction mode of the video coding standard at stage 1006 following stage 708. In some embodiments, during the encoding at stage 1006, a search window of motion estimation for a basic processing sub-unit in the resolution-enhanced input region 702 can be an ROI (e.g. determined based on the image segmentation technique) in a reference picture (e.g., included in prediction reference 224 in FIGS. 2A-2B) associated with input region 702. By restricting the search window in such a manner, it can be ensured that the matching region of the basic processing sub-unit will be from a region encoded with higher quality, assuming that the ROI in the reference picture has been encoded with higher quality (e.g., processed in a manner similar to stage 708).

In some embodiments, if input region 702 is decoded using inter prediction at stage 1004 and is determined to have the first level of spatial importance at stage 704, input region 702 can be processed at stage 706 differently depending on whether any basic processing sub-unit of input region 702 has a size undefined in the video coding standard after the resolution of input region 702 is increased by the scaling factor.

Figure 11:
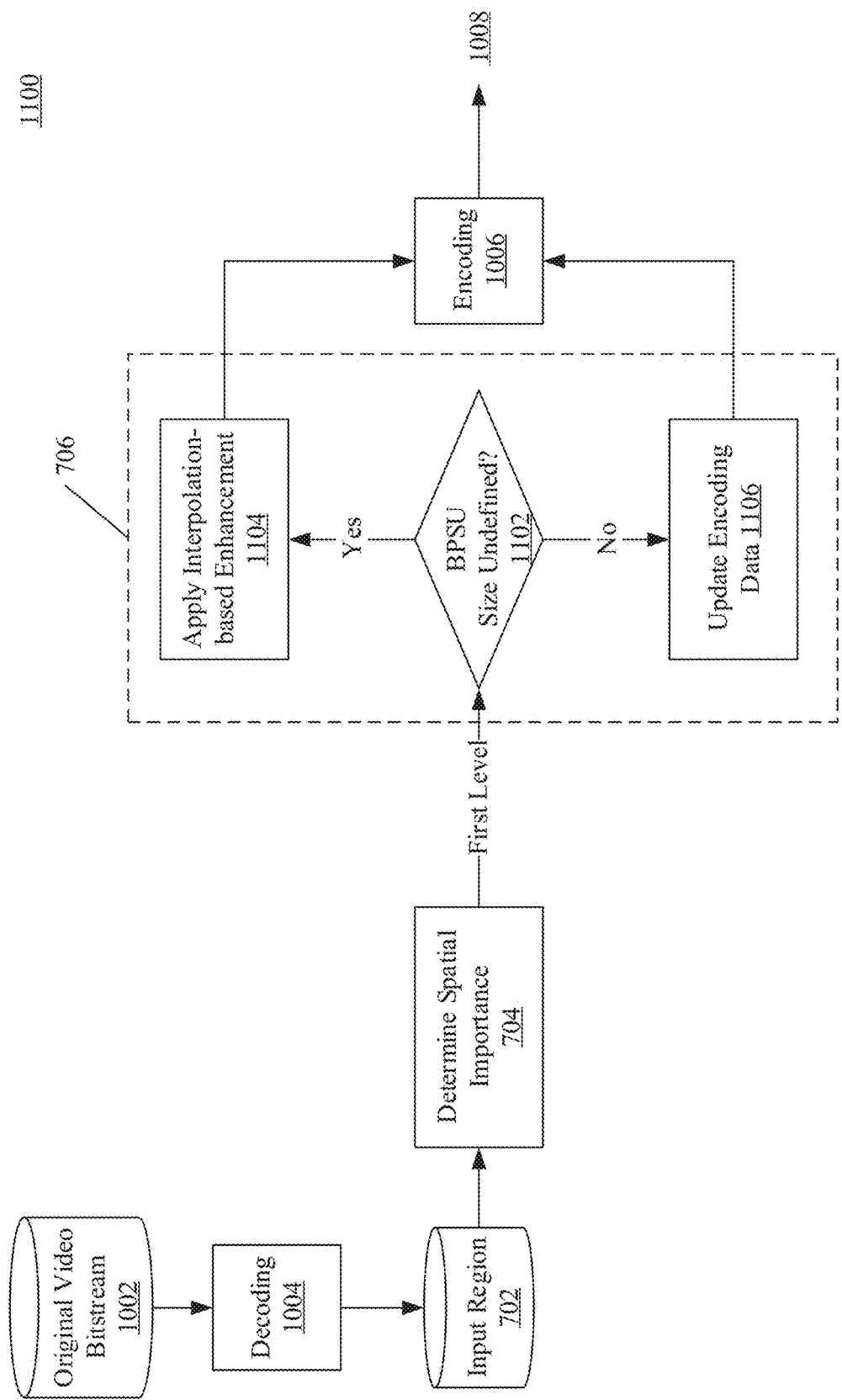
FIG. 11 illustrates a schematic diagram illustrating another example process of video transcoding, according to some embodiments of this disclosure.

FIG. 11 illustrates a schematic diagram illustrating an example process 1100 of video transcoding, according to some embodiments of this disclosure. Process 1100 illustrates an embodiment of stage 706 in process 1000 of FIG. 10. In FIG. 11, input region 702 is decoded using inter prediction at stage 1004 of FIG. 10 and is determined to have the first level of spatial importance at stage 704.

At stage 1102, it is determined whether any basic processing sub-unit (BPSU) of input region 702 has a size undefined in the video coding standard after the resolution of input region 702 is increased by the scaling factor.

For example, the video coding standard used for transcoding can have defined sizes for basic processing sub-units. Depending on the video coding standards, the basic processing sub-unit can be a block, a coding unit (CU), or the like. In some embodiments, if the video coding standard is H.265/HEVC, the basic processing sub-units are CUs. In an example, input region 702 can include a CU having a size of 64×64 pixels. If the scaling factor is 2, the CU can be enlarged to be 128×128 pixels after resolution enhancement assuming the CU partitioning scheme of input region 702 is not changed during encoding at stage 1006. The CU size of 128×128 pixels exceeds the maximum allowed CU size in H.265/HEVC (i.e., 64×64 pixels), in which an H.265/HEVC codec cannot transcode the enlarged CU. In another example, input region 702 can include a CU having a size of 8×8 pixels. If the scaling factor is 3, the CU can be enlarged to be 24×24 pixels after resolution enhancement assuming the CU partitioning scheme of input region 702 is not changed during encoding at stage 1006. The CU size of 24×24 pixels are undefined in H.265/HEVC, in which an H.265/HEVC codec cannot transcode the enlarged CU.

If it is determined at stage 1102 that at least one basic processing sub-unit of input region 702 has the size undefined in the video coding standard after the resolution of input region 702 is increased by the scaling factor, the interpolation-based technique can be applied to input region 702 at stage 1104, and input region 702 can be encoded (e.g., via process 200A or 200B in FIGS. 2A-2B) at stage 1006 after stage 1104. In some embodiments, at stage 1102, input region 702 can be upscaled by the scaling factor, and then it can be determined whether any basic processing sub-unit of the upscaled input region 702 has the size undefined in the video coding standard. For example, when upscaling input region 702, each basic processing sub-unit of it can be enlarged in x- and y-directions. For example, if the scaling factor is an integer n, a basic processing sub-unit can be enlarged in x- and y-directions by duplicating each pixel into an n×n array. If at least one basic processing sub-unit of input region 702 has the size undefined in the video coding standard, the interpolation-based technique can be applied to input region 702 at stage 1104, and input region 702 can be encoded at stage 1006 after stage 1104. By doing so, the partitioning scheme of basic processing sub-units (e.g., CUs) of input region 702 can be adjusted during the encoding at stage 1006 to ensure all basic processing sub-units of input region 702 to have defined sizes in the video coding standard.

If it is determined at stage 1102 that no basic processing sub-unit of input region 702 has the size undefined in the video coding standard after the resolution of input region 702 is increased by the scaling factor, input region 702 can be applied with no resolution enhancement, and input region 702 itself will not be encoded at stage 1006. In some embodiments, at stage 1102, input region 702 can be upscaled by the scaling factor, and then it can be determined whether any basic processing sub-unit of the upscaled input region 702 has the size undefined in the video coding standard. For example, input region 702 can be upscaled in a similar way as described above. If no basic processing sub-unit of input region 702 has the size undefined in the video coding standard, input region 702 can be applied with no resolution enhancement, and input region 702 itself will not be encoded at stage 1006. As shown in FIG. 11, at stage 1106, encoding data associated with input region 702 can be updated in accordance with the scaling factor.

In some embodiments, the encoding data can be decoded from original video bitstream 1002 at stage 1004. In some embodiments, the encoding data can include at least one of decoded coordinates of a matching region associated with input region 702, a decoded motion vector associated with the matching region, or a decoded residual region associated with input region 702. For example, input region 702 can be a current BPU being decoded in process 300A or 300B in FIGS. 3A-3B, the decoded coordinates of the matching region and the decoded motion vector can be included in prediction data 206 in FIGS. 3A-3B, and the decoded residual region can be reconstructed residual BPU 222 in FIGS. 3A-3B.

When updating the encoding data at stage 1106, a location and a size of the decoded coordinates of the matching region can be upscaled, and a location and a magnitude of the decoded motion vector can be upscaled. For example, assuming the origin of coordinates of pixels of a picture is at the top left corner of the picture, starting coordinates of the motion vector can be ($mv_x$, $env_y$), and a magnitude (e.g., length) of the motion vector can be a. When upscaling the motion vector, if the scaling factor is 2, the starting coordinates of the motion vector can be upscaled as ($2mv_x$, $2mv_y$), and the magnitude of the motion vector can be up scaled as 2a while the direction of the motion vector can be unchanged. For another example, assuming the origin of coordinates of pixels of a picture is at the top left corner of the picture, the values of the coordinates of four corners of the matching region can be ($x_1$, $y_1$), ($x_2$, $y_1$), ($x_1$, $y_2$), and ($x_2$, $y_2$). When upscaling the location and size of the coordinates of the matching region, if the scaling factor is 4, the coordinates of the four corners of the matching region can be upscaled as ($4_{x_1}$, $4_{y_1}$), ($4_{x_2}$, $4_{y_1}$), ($4_{x_1}$, $4_{y_2}$), and ($4_{x_2}$, $4_{y_2}$), respectively.

In some embodiments, at stage 1106, it can be further determined whether any pixel of the decoded residual region (e.g., reconstructed residual BPU 222) has a value (e.g., a greyscale value or an RGB value) exceeding a predetermined threshold value. If no pixel of the decoded residual region has a value exceeding the predetermined threshold value, the decoded residual region can be enlarged by the scaling factor. For example, if the scaling factor is 3, each pixel of the decoded residual region can be duplicated by 3 times along the x-direction and the y-direction to generate a 3×3 duplicated pixel bloc, and all of the generated duplicated pixel blocs can be arranged in the same positioning scheme as the pixels of the decoded residual region, in which the enlarged residual region can have a triple size of the decoded residual region. If at least one pixel of the decoded residual region has a value exceeding the predetermined threshold value, a new residual region can be determined at stage 1106 based on the upscaled matching region and upscaled motion vector. For example, if the scaling factor is 3, input region 702 can be upscaled in a similar manner as its matching region as described above, and the new residential region can be determined by subtracting pixel values of the upscaled input region 702 from the upscaled matching region. The new residual region can have a triple size of the decoded residual region.

In some embodiments, the encoding data associated with input region 702 updated at stage 1106 can be encoded at stage 1006 using an inter prediction mode of the video coding standard. In some embodiments, when encoding the updated encoding data associated with input region 702 in accordance with the scaling factor, a quantization parameter can be used (e.g., at quantization stage 214 in FIGS. 2A-2B), which can have a value higher than or equal to a value of an original quantization parameter used by original encoded video bitstream 1002 to encode input region 702. By using such a quantization parameter, input region 702 can be further compressed to reduce its size.

Figure 12:
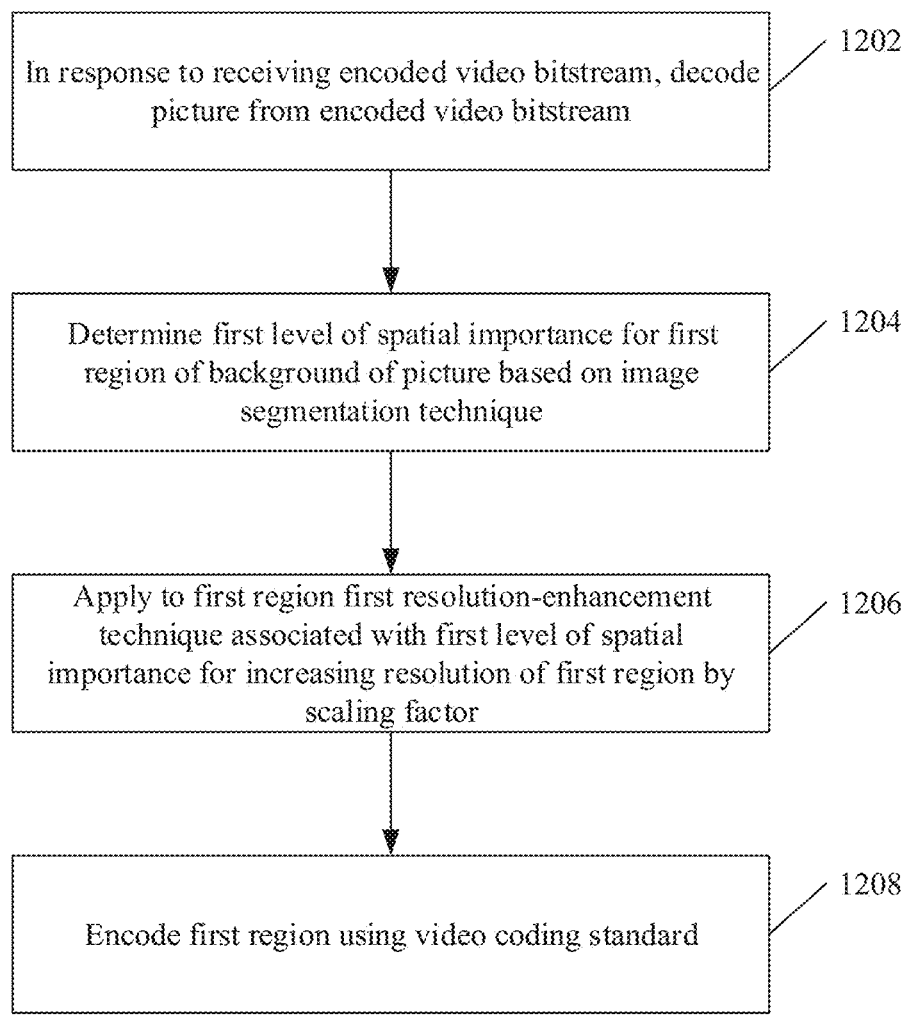
FIG. 12 illustrates a flowchart of an example process of video transcoding, according to some embodiments of this disclosure.
Figure 13:
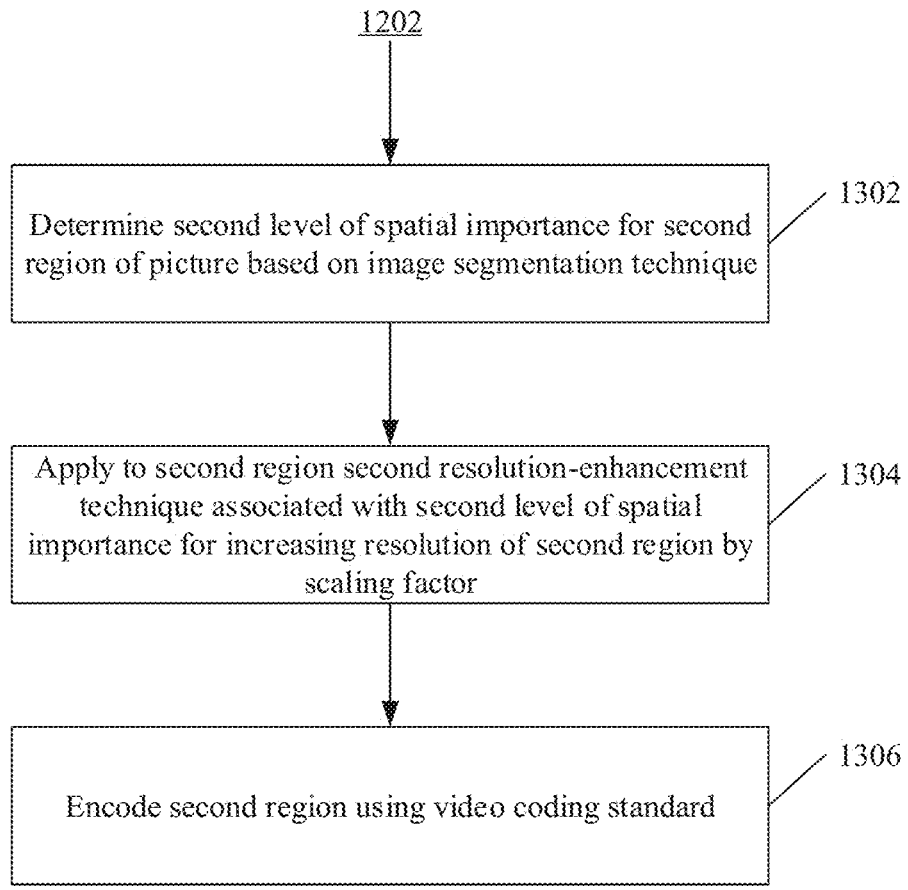
FIG. 13 illustrates a flowchart of another example process of video transcoding, according to some embodiments of this disclosure.
Figure 14:
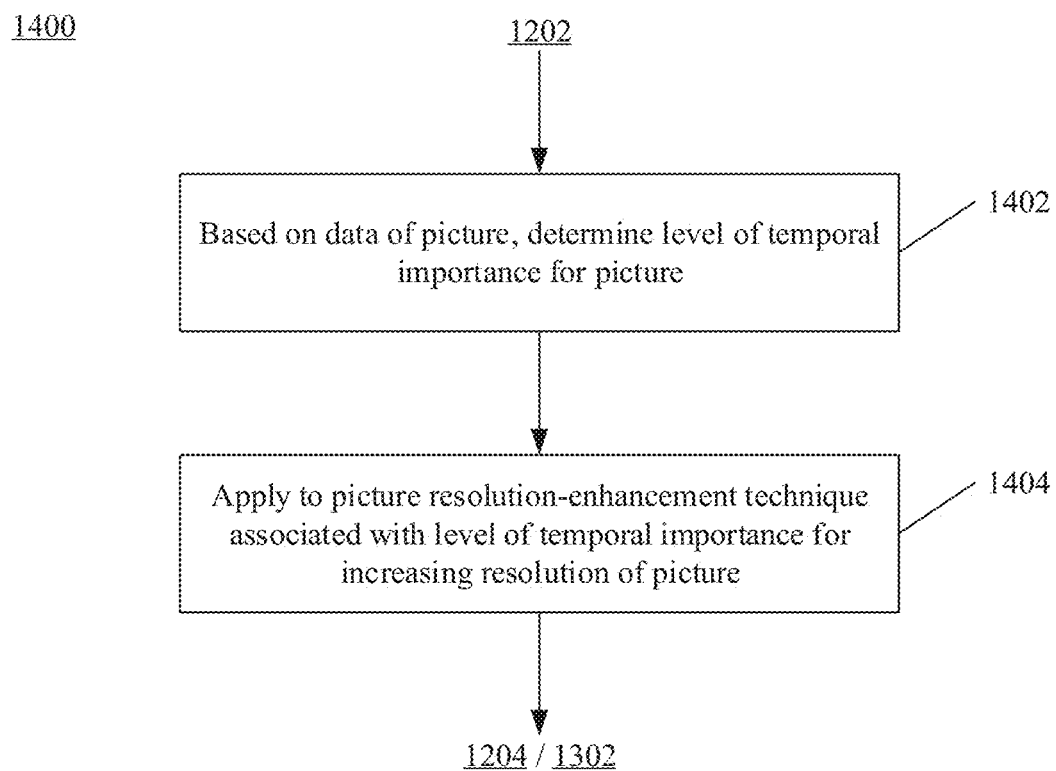
FIG. 14 illustrates a flowchart of yet another example process of video transcoding, according to some embodiments of this disclosure.

FIGS. 12-14 illustrate flowcharts of example processes 1200-1400 of video transcoding, according to some embodiments of this disclosure. In some embodiments, processes 1200-1400 can be performed by a codec (e.g., an encoder in FIGS. 2A-2B or a decoder in FIGS. 3A-3B). For example, the codec can be implemented as one or more software or hardware components of an apparatus (e.g., apparatus 400) for encoding or transcoding a video sequence.

FIG. 12 illustrates a flowchart of an example process 1200 of video processing, according to some embodiments of this disclosure.

At step 1202, in response to receiving an encoded video bitstream (e.g., video bitstream 228 in FIGS. 3A-3B), the apparatus decodes a picture (e.g., a current picture) from the encoded video bitstream. For example, step 1202 can be implemented similar to stage 1004 in FIG. 10.

At step 1204, the apparatus determines a first level (e.g., the first level in FIG. 10) of spatial importance for a first region (e.g., input region 702 in FIG. 10) of the picture based on an image segmentation technique (e.g., a semantic segmentation technique or an instance segmentation technique). For example, step 1204 can be implemented similar to stage 704 in FIG. 7 or 10, or stage 902 in FIG. 9.

At step 1206, the apparatus applies to the first region a first resolution-enhancement technique (e.g., the interpolation-based technique or no enhancement at stage 706 in FIG. 10) associated with the first level of spatial importance for increasing resolution of the first region by a scaling factor. The first region with increased resolution can be, for example, upscaled region 1008 in FIG. 10. In some embodiments, the apparatus can select the first resolution-enhancement technique from a set of resolution-enhancement techniques having different computational complexity levels. For example, the set of resolution-enhancement techniques can include a reconstruction-based technique, an interpolation-based technique (e.g., a bilinear interpolation technique or a bicubic interpolation technique), and a null operation that does not perform any resolution enhancement.

In some embodiments, when performing step 1206, the apparatus can determine whether the first region is decoded (e.g., at step 1202) using intra prediction or inter prediction. If the first region is decoded using the intra prediction, the apparatus can apply to the first region one of the interpolation-based technique or the reconstruction-based technique. In some embodiments, based on a maximum computational complexity allowed by the device, the apparatus can select one of the reconstruction-based technique or the interpolation-based technique (e.g., a bilinear interpolation technique or a bicubic interpolation technique) for applying to the first region.

In some embodiments, if the first region is decoded using the inter prediction, similar to stage 1102 in FIG. 11, the apparatus can determine whether any basic processing sub-unit of the first region has a size undefined in the video coding standard after the resolution of the first region is increased by the scaling factor. The basic processing sub-unit can varies depending on the video coding standard. For example, the basic processing sub-unit can be a block (e.g., as in MPEG family, H.261, H.263, or H.264/AVC), a coding unit (e.g., as in H.265/HEVC or H.266/VVC), or the like.

If at least one basic processing sub-unit of the first region has the size undefined in the video coding standard after the resolution of the first region is increased by the scaling factor, similar to stage 1104 in FIG. 11, the apparatus can apply to the first region one of the interpolation-based technique or the reconstruction-based technique.

If no basic processing sub-unit of the first region has the size undefined in the video coding standard after the resolution of the first region is increased by the scaling factor, the apparatus can apply to the first region the null operation (i.e., no resolution enhancement is applied to the first region). Further, similar to stage 1106 in FIG. 11, the apparatus can update encoding data associated with the first region in accordance with the scaling factor. In some embodiments, the encoding data can be decoded from the encoded video bitstream at step 1202. For example, the encoding data can include at least one of decoded coordinates of a matching region associated with the first region (e.g., included in prediction data 206 in FIGS. 3A-3B), a decoded motion vector associated with the matching region (e.g., included in prediction data 206 in FIGS. 3A-3B), or a decoded residual region (e.g., reconstructed residual BPU in FIGS. 3A-3B) associated with the first region.

In some embodiments, when updating the encoding data, the apparatus can upscale, by the scaling factor, a location and a size of the decoded coordinates of the matching region, and upscale a location and a magnitude of the decoded motion vector. In some embodiments, the apparatus can determine whether any pixel of the decoded residual region has a value exceeding a predetermined threshold value. If no pixel of the decoded residual region has a value exceeding the predetermined threshold value, the apparatus can enlarge the decoded residual region by the scaling factor. Otherwise, if at least one pixel of the decoded residual region has a value exceeding the predetermined threshold value, the apparatus can determine a residual region based on the upscaled matching region and upscaled motion vector. The details of upscaling the location and size of the decoded coordinates of the matching region and upscaling the location and magnitude of the decoded motion vector are described in association with stage 1106 in FIG. 11 and will not be repeated hereinafter.

Still referring to FIG. 12, at step 1208, the apparatus encodes the first region using a video coding standard (e.g., any of MPEG family, any of H.26x family, or the like). In some embodiments, if the first region is decoded using the inter prediction and no basic processing sub-unit of the first region has the size undefined in the video coding standard after the resolution of the first region is increased by the scaling factor, the apparatus can encode the first region by encoding the updated encoding data (e.g., updated at stage 1106 in FIG. 11) using an inter prediction mode of the video coding standard. In some embodiments, the apparatus can encode the updated encoding data using a quantization parameter having a value higher than or equal to a value of a quantization parameter used by the encoded video bitstream to encode the first region. By doing so, the apparatus can ensure that the size of the transcoded first region is not greatly increased.

In some embodiments, the apparatus can receive and transcode a second region of the picture. FIG. 13 illustrates a flowchart of an example process 1300 of video transcoding, according to some embodiments of this disclosure. In some embodiments, process 1300 that includes steps 1302-1306 can be combined with process 1200 to transcode a video with resolution enhancement. For example, process 1300 can be performed after step 1202 of process 1200. In some embodiments, the apparatus can perform steps 1302-1306 after performing step 1208. In some embodiments, the apparatus can perform steps 1302-1306 in parallel with performing steps 1204-1208.

At step 1302, the apparatus determines a second level (e.g., the second level in FIG. 10) of spatial importance for the second region based on the image segmentation technique, in which the second level of spatial importance is higher than the first level of spatial importance.

At step 1304, the apparatus applies to the second region a second resolution-enhancement technique associated with the second level of spatial importance for increasing resolution of the second region by the scaling factor. In some embodiments, the computational complexity of the second resolution-enhancement technique can be higher than the computational complexity of the first resolution-enhancement technique. In some embodiments, the second resolution-enhancement technique can be one of the learning-based technique (e.g., the DNN-based resolution-enhancement technique at stage 708 in FIG. 10) or the reconstruction-based technique.

At step 1306, the apparatus encodes the second region using the video coding standard. In some embodiments, the apparatus can encode the second region using a quantization parameter having a value smaller than or equal to a value of a quantization parameter used for encoding the first region. By doing so, the apparatus can ensure the coding quality of the second region is higher than the coding quality of the first region.

In some embodiments, when performing step 1306, the apparatus can determine whether the second region is decoded (e.g., at step 1202) using intra prediction or inter prediction. If the second region is decoded using the inter prediction, the apparatus can encode the second region using an inter prediction mode of the video coding standard. In some embodiments, when encoding the second region using the inter prediction mode, the apparatus can perform motion estimation for a basic processing sub-unit in the second region, in which a search window of the basic processing sub-unit can be a region of interest in a reference picture (e.g., included in prediction reference 224 in FIGS. 3A-3B) associated with the second region.

FIG. 14 illustrates a flowchart of an example process 1400 of video transcoding, according to some embodiments of this disclosure. In some embodiments, process 1400 can be combined with process 1200 or 1300 to transcode a video with resolution enhancement. For example, process 1400 can be performed after step 1202 of process 1200 or 1300, and before step 1204 of process 1200 or step 1302 of process 1300.

At step 1402, based on data of the picture (e.g., decoded at stage 1004 in FIG. 10), the apparatus can determine a level (e.g., the first or second level in FIG. 8) of temporal importance for the picture. For example, step 1402 can be implemented similar to stage 804 in FIG. 8 or stage 902 in FIG. 9.

At step 1404, the apparatus can apply to the picture a resolution-enhancement technique (e.g., the resolution-enhancement technique at stages 806 or 808 in FIG. 8)

associated with the level of temporal importance for increasing resolution of the picture. The picture with increased resolution can be, for example, enhanced picture 810 in FIG. 8.

In response to applying to the picture the resolution-enhancement technique, the apparatus can determine the first level of spatial importance for the first region of the picture. That is, the apparatus can perform step 1204 or 1302 after performing step 1404.

In some embodiments, after applying to all regions of the picture respective resolution-enhancement techniques, the apparatus can generate a resolution-enhanced picture by merging the regions. For example, the apparatus can merge the regions by operations similar to stage 812 in FIG. 8. For another example, the apparatus can merge the regions by operations similar to both stages 812 and 814 in FIG. 8. After generating the resolution-enhanced picture, the apparatus can encode it into a video bitstream (e.g., upscaled video bitstream 1010 in FIG. 10).

In some embodiments, the apparatus can apply to the first region at least one of a deblurring technique or a denoising technique. The denoising technique can remove or reduce noise (e.g., random values added to pixel values) from the first region. The deblurring technique can remove or reduce blur (e.g., resulting from applying a low-pass filter to pixel values) from the first region. In some embodiments, the deblurring and denoising techniques can include those described at stage 814 in FIG. 8.

In some embodiments, the apparatus can apply the first resolution-enhancement technique and the at least one of the deblurring technique or the denoising technique in any order. For example, the apparatus can apply the first resolution-enhancement technique before applying the at least one of the deblurring technique or the denoising technique. For another example, the apparatus can apply the first resolution-enhancement technique after applying the at least one of the deblurring technique or the denoising technique. For another example, the apparatus can apply the first resolution-enhancement technique between applying the deblurring technique (or the denoising technique) and applying the denoising technique (or the deblurring technique). In some embodiments, the deblurring technique and the denoising technique can be merged to be a single operation.

In some embodiments, a non-transitory computer-readable storage medium including instructions (such as instructions associated with the functionality described in FIGS. 7-14) is also provided, and the instructions can be executed by a device (such as the disclosed encoder and decoder) for performing the above-described methods. Common forms of non-transitory media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, an EPROM, a FLASH-EPROM or any other flash memory, NVRAM, a cache, a register, any other memory chip or cartridge, and networked versions of the same. The device can include one or more processors (CPUs), an input/output interface, a network interface, and/or a memory.

It is appreciated that the above-described embodiments can be implemented by hardware, or software (program codes), or a combination of hardware and software. If implemented by software, it can be stored in the above-described computer-readable media. The software, when executed by the processor, can perform the disclosed methods. The computing units and other functional units described in the present disclosure can be implemented by hardware, or software, or a combination of hardware and software. One of ordinary skill in the art will also understand that multiple ones of the above-described modules/units can be combined as one module/unit, and each of the above-described modules/units can be further divided into a plurality of sub-modules/sub-units.

The embodiments can further be described using the following clauses:

1. A non-transitory computer-readable storage medium storing a set of instructions that are executable by one or more processors of a device to cause the device to perform a method comprising:

in response to receiving an encoded video bitstream, decoding a picture from the encoded video bitstream;

determining a first level of spatial importance for a first region of a background of the picture based on an image segmentation technique;

applying to the first region a first resolution-enhancement technique associated with the first level of spatial importance for increasing resolution of the first region by a scaling factor, wherein the first resolution-enhancement technique is selected from a set of resolution-enhancement techniques having different computational complexity levels; and encoding the first region using a video coding standard.

2. The non-transitory computer-readable storage medium of clause 1, wherein the set of instructions that are executable by the one or more processors cause the device to further perform:

determining a second level of spatial importance for a second region of the picture based on the image segmentation technique, wherein the second level of spatial importance is higher than the first level of spatial importance, and the second region is part of one of the background or a region of interest of the picture;

applying to the second region a second resolution-enhancement technique associated with the second level of spatial importance for increasing resolution of the second region by the scaling factor, wherein computational complexity of the second resolution-enhancement technique is higher than computational complexity of the first resolution-enhancement technique; and encoding the second region using the video coding standard.

3. The non-transitory computer-readable storage medium of clause 2, wherein encoding the second region further comprises:

encoding the second region using a quantization parameter having a value smaller than or equal to a value of a quantization parameter used for encoding the first region.

4. The non-transitory computer-readable storage medium of any of clauses 2-3, wherein encoding the second region further comprises:

determining whether the second region is decoded using intra prediction or inter prediction; and based on a determination that the second region is decoded using the inter prediction, encoding the second region using an inter prediction mode of the video coding standard, wherein a search window of motion estimation for a basic processing sub-unit in the second region is a region of interest in a reference picture associated with the second region.

5. The non-transitory computer-readable storage medium of any of clauses 2-4, wherein the second resolution-enhancement technique is a learning-based technique, and the first resolution-enhancement technique is one of an interpolation-based technique, a reconstruction-based technique, or a null operation that does not perform any resolution enhancement.
6. The non-transitory computer-readable storage medium of clause 5, wherein applying to the first region the first resolution-enhancement technique further comprises:
determining whether the first region is decoded using intra prediction or inter prediction; and
based on a determination that the first region is decoded using the intra prediction, applying to the first region one of the interpolation-based technique or the reconstruction-based technique.
7. The non-transitory computer-readable storage medium of any of clauses 5-6, wherein the set of instructions that are executable by the one or more processors cause the device to further perform:
based on a maximum computational complexity allowed by the device, selecting one of the reconstruction-based technique or the interpolation-based technique for applying to the first region.
8. The non-transitory computer-readable storage medium of any of clauses 6-7, wherein the set of instructions that are executable by the one or more processors cause the device to further perform:
based on a determination that the first region is decoded using the inter prediction, determining whether any basic processing sub-unit of the first region has a size undefined in the video coding standard after the resolution of the first region is increased by the scaling factor;
based on a determination that no basic processing sub-unit of the first region has the size undefined in the video coding standard after the resolution of the first region is increased by the scaling factor, applying to the first region the null operation; and
updating encoding data associated with the first region in accordance with the scaling factor, wherein the encoding data is decoded from the encoded video bitstream.
9. The non-transitory computer-readable storage medium of clause 8, wherein the set of instructions that are executable by the one or more processors cause the device to further perform:
based on a determination that at least one basic processing sub-unit of the first region has the size undefined in the video coding standard after the resolution of the first region is increased by the scaling factor, applying to the first region one of the interpolation-based technique or the reconstruction-based technique.
10. The non-transitory computer-readable storage medium of any of clauses 8-9, wherein encoding the first region further comprises:
encoding the updated encoding data using an inter prediction mode of the video coding standard.
11. The non-transitory computer-readable storage medium of clause 10, wherein encoding the updated encoding data further comprises:
encoding the updated encoding data using a quantization parameter having a value higher than or equal to a value of a quantization parameter used by the encoded video bitstream to encode the first region.
12. The non-transitory computer-readable storage medium of any of clauses 8-11, wherein the encoding data comprises at least one of decoded coordinates of a matching region associated with the first region, a decoded motion vector associated with the matching region, or a decoded residual region associated with the first region.

13. The non-transitory computer-readable storage medium of any of clauses 8-12, wherein updating the encoding data further comprises:
upscaling, by the scaling factor, a location and a size of the decoded coordinates of the matching region, and a location and a magnitude of the decoded motion vector;
determining whether any pixel of the decoded residual region has a value exceeding a predetermined threshold value;
based on a determination that no pixel of the decoded residual region has a value exceeding the predetermined threshold value, enlarging the decoded residual region by the scaling factor; and
based on a determination that at least one pixel of the decoded residual region has a value exceeding the predetermined threshold value, determining a residual region based on the upscaled matching region and upscaled motion vector.
14. The non-transitory computer-readable storage medium of any of clauses 4-13, wherein basic processing sub-unit comprises one of a block or a coding unit.
15. The non-transitory computer-readable storage medium of any of clauses 1-14, wherein the image segmentation technique comprises one of a semantic segmentation technique or an instance segmentation technique.
16. An apparatus, comprising:
a memory configured to store a set of instructions; and
one or more processors coupled to the memory and configured to execute the set of instructions to cause the apparatus to:
in response to receiving an encoded video bitstream, decode a picture from the encoded video bitstream;
determine a first level of spatial importance for a first region of a background of the picture based on an image segmentation technique;
apply to the first region a first resolution-enhancement technique associated with the first level of spatial importance for increasing resolution of the first region by a scaling factor, wherein the first resolution-enhancement technique is selected from a set of resolution-enhancement techniques having different computational complexity levels; and
encode the first region using a video coding standard.
17. The apparatus of clause 16, wherein the one or more processors are further configured to execute the set of instructions to cause the apparatus to:
determine a second level of spatial importance for a second region of the picture based on the image segmentation technique, wherein the second level of spatial importance is higher than the first level of spatial importance, and the second region is part of one of the background or a region of interest of the picture;
apply to the second region a second resolution-enhancement technique associated with the second level of spatial importance for increasing resolution of the second region by the scaling factor, wherein computational complexity of the second resolution-enhancement technique is higher than computational complexity of the first resolution-enhancement technique; and
encode the second region using the video coding standard.
18. The apparatus of clause 17, wherein the one or more processors configured to execute the set of instructions to cause the apparatus to encode the second region further cause the apparatus to:

encode the second region using a quantization parameter having a value smaller than or equal to a value of a quantization parameter used for encoding the first region.

19. The apparatus of any of clauses 17-18, wherein the one or more processors configured to execute the set of instructions to cause the apparatus to encode the second region further cause the apparatus to:
determine whether the second region is decoded using intra prediction or inter prediction; and
based on a determination that the second region is decoded using the inter prediction, encode the second region using an inter prediction mode of the video coding standard, wherein a search window of motion estimation for a basic processing sub-unit in the second region is a region of interest in a reference picture associated with the second region.

20. The apparatus of any of clauses 17-19, wherein the second resolution-enhancement technique is a learning-based technique, and the first resolution-enhancement technique is one of an interpolation-based technique, a reconstruction-based technique, or a null operation that does not perform any resolution enhancement.

21. The apparatus of clause 20, wherein the one or more processors configured to execute the set of instructions to cause the apparatus to apply to the first region the first resolution-enhancement technique further cause the apparatus to:
determine whether the first region is decoded using intra prediction or inter prediction; and
based on a determination that the first region is decoded using the intra prediction, apply to the first region one of the interpolation-based technique or the reconstruction-based technique.

22. The apparatus of any of clauses 20-21, wherein the one or more processors are further configured to execute the set of instructions to cause the apparatus to:
based on a maximum computational complexity allowed by the device, select one of the reconstruction-based technique or the interpolation-based technique for applying to the first region.

23. The apparatus of any of clauses 21-22, wherein the one or more processors are further configured to execute the set of instructions to cause the apparatus to:
based on a determination that the first region is decoded using the inter prediction, determine whether any basic processing sub-unit of the first region has a size undefined in the video coding standard after the resolution of the first region is increased by the scaling factor;
based on a determination that no basic processing sub-unit of the first region has the size undefined in the video coding standard after the resolution of the first region is increased by the scaling factor, apply to the first region the null operation; and update encoding data associated with the first region in accordance with the scaling factor, wherein the encoding data is decoded from the encoded video bitstream.

24. The apparatus of clause 23, wherein the one or more processors are further configured to execute the set of instructions to cause the apparatus to:
based on a determination that at least one basic processing sub-unit of the first region has the size undefined in the video coding standard after the resolution of the first region is increased by the scaling factor, apply to the first region one of the interpolation-based technique or the reconstruction-based technique.

25. The apparatus of any of clauses 23-24, wherein the one or more processors configured to execute the set of instructions to cause the apparatus to encode the first region further cause the apparatus to:
encode the updated encoding data using an inter prediction mode of the video coding standard.

26. The apparatus of clause 25, wherein the one or more processors configured to execute the set of instructions to cause the apparatus to encode the updated encoding data further cause the apparatus to:
encode the updated encoding data using a quantization parameter having a value higher than or equal to a value of a quantization parameter used by the encoded video bitstream to encode the first region.

27. The apparatus of any of clauses 23-26, wherein the encoding data comprises at least one of decoded coordinates of a matching region associated with the first region, a decoded motion vector associated with the matching region, or a decoded residual region associated with the first region.

28. The apparatus of any of clauses 23-27, wherein the one or more processors configured to execute the set of instructions to cause the apparatus to update the encoding data further cause the apparatus to:
upscale, by the scaling factor, a location and a size of the decoded coordinates of the matching region, and a location and a magnitude of the decoded motion vector;
determine whether any pixel of the decoded residual region has a value exceeding a predetermined threshold value;
based on a determination that no pixel of the decoded residual region has a value exceeding the predetermined threshold value, enlarge the decoded residual region by the scaling factor; and
based on a determination that at least one pixel of the decoded residual region has a value exceeding the predetermined threshold value, determine a residual region based on the upscaled matching region and upscaled motion vector.

29. The apparatus of any of clauses 19-28, wherein basic processing sub-unit comprises one of a block or a coding unit.

30. The apparatus of any of clauses 16-29, wherein the image segmentation technique comprises one of a semantic segmentation technique or an instance segmentation technique.

31. A computer-implemented method, comprising:
in response to receiving an encoded video bitstream, decoding a picture from the encoded video bitstream;
determining a first level of spatial importance for a first region of a background of the picture based on an image segmentation technique;
applying to the first region a first resolution-enhancement technique associated with the first level of spatial importance for increasing resolution of the first region by a scaling factor, wherein the first resolution-enhancement technique is selected from a set of resolution-enhancement techniques having different computational complexity levels; and
encoding the first region using a video coding standard.

32. The computer-implemented method of clause 31, further comprising:
determining a second level of spatial importance for a second region of the picture based on the image segmentation technique, wherein the second level of spatial importance is higher than the first level of spatial importance, and the second region is part of one of the background or a region of interest of the picture;

applying to the second region a second resolution-enhancement technique associated with the second level of spatial importance for increasing resolution of the second region by the scaling factor, wherein computational complexity of the second resolution-enhancement technique is higher than computational complexity of the first resolution-enhancement technique; and encoding the second region using the video coding standard.

33. The computer-implemented method of clause 32, wherein encoding the second region comprises:

encoding the second region using a quantization parameter having a value smaller than or equal to a value of a quantization parameter used for encoding the first region.

34. The computer-implemented method of any of clauses 32-33, wherein encoding the second region comprises:

determining whether the second region is decoded using intra prediction or inter prediction; and based on a determination that the second region is decoded using the inter prediction, encoding the second region using an inter prediction mode of the video coding standard, wherein a search window of motion estimation for a basic processing sub-unit in the second region is a region of interest in a reference picture associated with the second region.

35. The computer-implemented method of any of clauses 32-34, wherein the second resolution-enhancement technique is a learning-based technique, and the first resolution-enhancement technique is one of an interpolation-based technique, a reconstruction-based technique, or a null operation that does not perform any resolution enhancement.

36. The computer-implemented method of clause 35, wherein applying to the first region the first resolution-enhancement technique comprises:

determining whether the first region is decoded using intra prediction or inter prediction; and based on a determination that the first region is decoded using the intra prediction, applying to the first region one of the interpolation-based technique or the reconstruction-based technique.

37. The computer-implemented method of any of clauses 35-36, further comprising:

based on a maximum computational complexity allowed by the device, selecting one of the reconstruction-based technique or the interpolation-based technique for applying to the first region.

38. The computer-implemented method of any of clauses 36-37, further comprising:

based on a determination that the first region is decoded using the inter prediction, determining whether any basic processing sub-unit of the first region has a size undefined in the video coding standard after the resolution of the first region is increased by the scaling factor;

based on a determination that no basic processing sub-unit of the first region has the size undefined in the video coding standard after the resolution of the first region is increased by the scaling factor, applying to the first region the null operation; and updating encoding data associated with the first region in accordance with the scaling factor, wherein the encoding data is decoded from the encoded video bitstream.

39. The computer-implemented method of clause 38, further comprising:

based on a determination that at least one basic processing sub-unit of the first region has the size undefined in the video coding standard after the resolution of the first region is increased by the scaling factor, applying to the first region one of the interpolation-based technique or the reconstruction-based technique.

40. The computer-implemented method of any of clauses 38-39, wherein encoding the first region comprises:

encoding the updated encoding data using an inter prediction mode of the video coding standard.

41. The computer-implemented method of clause 40, wherein encoding the updated encoding data comprises:

encoding the updated encoding data using a quantization parameter having a value higher than or equal to a value of a quantization parameter used by the encoded video bitstream to encode the first region.

42. The computer-implemented method of any of clauses 38-41, wherein the encoding data comprises at least one of decoded coordinates of a matching region associated with the first region, a decoded motion vector associated with the matching region, or a decoded residual region associated with the first region.

43. The computer-implemented method of any of clauses 38-42, wherein updating the encoding data comprises:

upscaling, by the scaling factor, a location and a size of the decoded coordinates of the matching region, and a location and a magnitude of the decoded motion vector;

determining whether any pixel of the decoded residual region has a value exceeding a predetermined threshold value;

based on a determination that no pixel of the decoded residual region has a value exceeding the predetermined threshold value, enlarging the decoded residual region by the scaling factor; and based on a determination that at least one pixel of the decoded residual region has a value exceeding the predetermined threshold value, determining a residual region based on the upscaled matching region and upscaled motion vector.

44. The computer-implemented method of any of clauses 34-43, wherein basic processing sub-unit comprises one of a block or a coding unit.

45. The computer-implemented method of any of clauses 31-44, wherein the image segmentation technique comprises one of a semantic segmentation technique or an instance segmentation technique.

In addition to implementing the above method by using computer-readable program codes, the above method can also be implemented in a form of a logic gate, a switch, an ASIC, a programmable logic controller, and an embedded microcontroller. Therefore, such a controller can be considered as a hardware component, and apparatuses included in the controller and configured to implement various functions can also be considered as structures inside the hardware component. Or, the apparatuses configured to implement various functions can even be considered as both software modules configured to implement the method and structures inside the hardware component.

This disclosure can be described in a general context of a computer-executable instruction executed by a computer, for example, a program module. Generally, the program module includes a routine, a program, an object, an assembly, a data structure, a class, or the like used for executing a specific task or implementing a specific abstract data type. Embodiments of the disclosure can also be implemented in distributed computing environments. In the distributed computing environments, a task is executed by using remote processing devices connected through a communications network. In the distributed computing environments, the program module can be located in local and remote computer storage media, including a storage device.

It should be noted that the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open-ended in that an item or items following any one of these words is not meant to be an exhaustive listing of such item or items, or meant to be limited to only the listed item or items.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the disclosure disclosed herein. It is intended that the specification and examples be considered as examples only, with a true scope and spirit of the disclosure being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. A non-transitory computer-readable storage medium storing a set of instructions that are executable by one or more processors of a device to cause the device to perform a method comprising:
    in response to receiving an encoded video bitstream, decoding a picture from the encoded video bitstream;
    determining a value representing a first level of spatial importance for a first region of a background of the picture based on an image segmentation technique;
    determining a value representing a second level of spatial importance for a second region of the picture based on the image segmentation technique, wherein the second level of spatial importance is higher than the first level of spatial importance, and the second region is part of one of the background or a region of interest of the picture;
    applying to the first region a first resolution-enhancement technique associated with the first level of spatial importance for increasing resolution of the first region by a scaling factor, wherein the first resolution-enhancement technique is selected from a set of resolution-enhancement techniques having different computational complexity levels;
    applying to the second region a second resolution-enhancement technique associated with the second level of spatial importance for increasing resolution of the second region by the scaling factor, wherein a computational complexity of the second resolution-enhancement technique is higher than a computational complexity of the first resolution-enhancement technique; and
    encoding the first region and the second region using a video coding standard.

2. The non-transitory computer-readable storage medium of claim 1, wherein encoding the second region further comprises:
    encoding the second region using a quantization parameter having a value smaller than or equal to a value of a quantization parameter used for encoding the first region.

3. The non-transitory computer-readable storage medium of claim 1, wherein encoding the second region further comprises:
    determining whether the second region is decoded using intra prediction or inter prediction; and
    based on a determination that the second region is decoded using the inter prediction, encoding the second region using an inter prediction mode of the video coding standard, wherein a search window of motion estimation for a basic processing sub-unit in the second region is a region of interest in a reference picture associated with the second region.

4. The non-transitory computer-readable storage medium of claim 1, wherein the second resolution-enhancement technique is a learning-based technique, and the first resolution-enhancement technique is one of an interpolation-based technique, a reconstruction-based technique, or a null operation that does not perform any resolution enhancement.

5. The non-transitory computer-readable storage medium of claim 4, wherein applying to the first region the first resolution-enhancement technique further comprises:
    determining whether the first region is decoded using intra prediction or inter prediction; and
    based on a determination that the first region is decoded using the intra prediction, applying to the first region one of the interpolation-based technique or the reconstruction-based technique.

6. The non-transitory computer-readable storage medium of claim 5, wherein the set of instructions that are executable by the one or more processors cause the device to further perform:
    based on a maximum computational complexity allowed by the device, selecting one of the reconstruction-based technique or the interpolation-based technique for applying to the first region.

7. The non-transitory computer-readable storage medium of claim 5, wherein the set of instructions that are executable by the one or more processors cause the device to further perform:
    based on a determination that the first region is decoded using the inter prediction, determining whether any basic processing sub-unit of the first region has a size undefined in the video coding standard after the resolution of the first region is increased by the scaling factor;
    based on a determination that no basic processing sub-unit of the first region has the size undefined in the video coding standard after the resolution of the first region is increased by the scaling factor, applying to the first region the null operation; and
    updating encoding data associated with the first region in accordance with the scaling factor, wherein the encoding data is decoded from the encoded video bitstream.

8. The non-transitory computer-readable storage medium of claim 7, wherein the set of instructions that are executable by the one or more processors cause the device to further perform:
    based on a determination that at least one basic processing sub-unit of the first region has the size undefined in the video coding standard after the resolution of the first region is increased by the scaling factor, applying to the first region one of the interpolation-based technique or the reconstruction-based technique.

9. The non-transitory computer-readable storage medium of claim 7, wherein encoding the first region further comprises:
encoding the updated encoding data using an inter prediction mode of the video coding standard.

10. The non-transitory computer-readable storage medium of claim 9, wherein encoding the updated encoding data further comprises:
encoding the updated encoding data using a quantization parameter having a value higher than or equal to a value of a quantization parameter used by the encoded video bitstream to encode the first region.

11. The non-transitory computer-readable storage medium of claim 7, wherein the encoding data comprises at least one of decoded coordinates of a matching region associated with the first region, a decoded motion vector associated with the matching region, or a decoded residual region associated with the first region.

12. The non-transitory computer-readable storage medium of claim 11, wherein updating the encoding data further comprises:
upscaling, by the scaling factor, a location and a size of the decoded coordinates of the matching region, and a location and a magnitude of the decoded motion vector;
determining whether any pixel of the decoded residual region has a value exceeding a predetermined threshold value;
based on a determination that no pixel of the decoded residual region has a value exceeding the predetermined threshold value, enlarging the decoded residual region by the scaling factor; and
based on a determination that at least one pixel of the decoded residual region has a value exceeding the predetermined threshold value, determining a residual region based on the upscaled matching region and upscaled motion vector.

13. The non-transitory computer-readable storage medium of claim 7, wherein basic processing sub-unit comprises one of a block or a coding unit.

14. The non-transitory computer-readable storage medium of claim 1, wherein the image segmentation technique comprises one of a semantic segmentation technique or an instance segmentation technique.

15. An apparatus, comprising:
a memory configured to store a set of instructions; and
one or more processors coupled to the memory and configured to execute the set of instructions to cause the apparatus to:
in response to receiving an encoded video bitstream, decode a picture from the encoded video bitstream;
determine a value representing a first level of spatial importance for a first region of a background of the picture based on an image segmentation technique;
determine a value representing a second level of spatial importance for a second region of the picture based on the image segmentation technique, wherein the second level of spatial importance is higher than the first level of spatial importance, and the second region is part of one of the background or a region of interest of the picture;
apply to the first region a first resolution-enhancement technique associated with the first level of spatial importance for increasing resolution of the first region by a scaling factor, wherein the first resolu-
tion-enhancement technique is selected from a set of resolution-enhancement techniques having different computational complexity levels;
apply to the second region a second resolution-enhancement technique associated with the second level of spatial importance for increasing resolution of the second region by the scaling factor, wherein a computational complexity of the second resolution-enhancement technique is higher than a computational complexity of the first resolution-enhancement technique; and
encode the first region and the second region using a video coding standard.

16. The apparatus of claim 15, wherein the second resolution-enhancement technique is a learning-based technique, and the first resolution-enhancement technique is one of an interpolation-based technique, a reconstruction-based technique, or a null operation that does not perform any resolution enhancement.

17. The apparatus of claim 15, wherein the one or more processors configured to execute the set of instructions to cause the apparatus to apply to the first region the first resolution-enhancement technique are further configured to execute the set of instructions to cause the apparatus to:
determine whether the region is decoded using intra prediction or inter prediction; and
based on a determination that the region is decoded using the intra prediction, apply to the first region one of the interpolation-based technique or the reconstruction-based technique.

18. The apparatus of claim 17, wherein the one or more processors are further configured to execute the set of instructions to cause the apparatus to:
based on a determination that the region is decoded using the inter prediction, determine whether any basic processing sub-unit of the first region has a size undefined in the video coding standard after the resolution of the first region is increased by the scaling factor;
based on a determination that no basic processing sub-unit of the first region has the size undefined in the video coding standard after the resolution of the first region is increased by the scaling factor, apply to the first region the null operation; and
update encoding data associated with the first region in accordance with the scaling factor, wherein the encoding data is decoded from the encoded video bitstream.

19. The apparatus of claim 18, wherein the one or more processors are further configured to execute the set of instructions to cause the apparatus to:
based on a determination that at least one basic processing sub-unit of the first region has the size undefined in the video coding standard after the resolution of the first region is increased by the scaling factor, apply to the first region one of the interpolation-based technique or the reconstruction-based technique.

20. The apparatus of claim 18, wherein the one or more processors configured to execute the set of instructions to cause the apparatus to encode the first region are further configured to execute the set of instructions to cause the apparatus to:
encode the updated encoding data using an inter prediction mode of the video coding standard.

21. The apparatus of claim 18, wherein the encoding data comprises at least one of decoded coordinates of a matching region associated with the first region, a decoded motion vector associated with the matching region, or a decoded residual region associated with the first region.

22. The apparatus of claim 21, wherein the one or more processors configured to execute the set of instructions to cause the apparatus to update the encoding data are further configured to execute the set of instructions to cause the apparatus to:
- upscale, by the scaling factor, a location and a size of the decoded coordinates of the matching region, and a location and a magnitude of the decoded motion vector;
- determine whether any pixel of the decoded residual region has a value exceeding a predetermined threshold value;
- based on a determination that no pixel of the decoded residual region has a value exceeding the predetermined threshold value, enlarge the decoded residual region by the scaling factor; and
- based on a determination that at least one pixel of the decoded residual region has a value exceeding the predetermined threshold value, determine a residual region based on the upscaled matching region and upscaled motion vector.

23. A computer-implemented method, comprising:
- in response to receiving an encoded video bitstream, decoding a picture from the encoded video bitstream;
- determining a value representing a first level of spatial importance for a first region of a background of the picture based on an image segmentation technique;
- determining a value representing a second level of spatial importance for a second region of the picture based on the image segmentation technique, wherein the second level of spatial importance is higher than the first level of spatial importance, and the second region is part of one of the background or a region of interest of the picture;
- applying to the first region a first resolution-enhancement technique associated with the first level of spatial importance for increasing resolution of the first region by a scaling factor, wherein the first resolution-enhancement technique is selected from a set of resolution-enhancement techniques having different computational complexity levels;
- applying to the second region a second resolution-enhancement technique associated with the second level of spatial importance for increasing resolution of the second region by the scaling factor, wherein a computational complexity of the second resolution-enhancement technique is higher than a computational complexity of the first resolution-enhancement technique; and
- encoding the first region and the second region using a video coding standard.

24. The computer-implemented method of claim 23, wherein the second resolution-enhancement technique is a learning-based technique, and the first resolution-enhancement technique is one of an interpolation-based technique, a reconstruction-based technique, or a null operation that does not perform any resolution enhancement.

25. The computer-implemented method of claim 23, wherein applying to the first region the first resolution-enhancement technique comprises:
- determining whether the region is decoded using intra prediction or inter prediction; and
- based on a determination that the region is decoded using the intra prediction, applying to the first region one of the interpolation-based technique or the reconstruction-based technique.

26. The computer-implemented method of claim 25, further comprising:
- based on a determination that the region is decoded using the inter prediction, determining whether any basic processing sub-unit of the first region has a size undefined in the video coding standard after the resolution of the first region is increased by the scaling factor;
- based on a determination that no basic processing sub-unit of the first region has the size undefined in the video coding standard after the resolution of the first region is increased by the scaling factor, applying to the first region the null operation; and
- updating encoding data associated with the first region in accordance with the scaling factor, wherein the encoding data is decoded from the encoded video bitstream.

27. The computer-implemented method of claim 26, further comprising:
- based on a determination that at least one basic processing sub-unit of the first region has the size undefined in the video coding standard after the resolution of the first region is increased by the scaling factor, applying to the first region one of the interpolation-based technique or the reconstruction-based technique.

28. The computer-implemented method of claim 26, wherein encoding the first region comprises:
- encoding the updated encoding data using an inter prediction mode of the video coding standard.

29. The computer-implemented method of claim 26, wherein the encoding data comprises at least one of decoded coordinates of a matching region associated with the first region, a decoded motion vector associated with the matching region, or a decoded residual region associated with the first region.

30. The computer-implemented method of claim 29, wherein updating the encoding data comprises:
- upscaling, by the scaling factor, a location and a size of the decoded coordinates of the matching region, and a location and a magnitude of the decoded motion vector;
- determining whether any pixel of the decoded residual region has a value exceeding a predetermined threshold value; and
- based on a determination that no pixel of the decoded residual region has a value exceeding the predetermined threshold value, enlarging the decoded residual region by the scaling factor; or
- based on a determination that at least one pixel of the decoded residual region has a value exceeding the predetermined threshold value, determining a residual region based on the upscaled matching region and upscaled motion vector.

* * * * *